US012688496B2

(12) United States Patent
Saad et al.

(10) Patent No.:  US 12,688,496 B2
(45) Date of Patent:       Jul. 21, 2026

(54) MULTI-LAYER CRYPTOCURRENCY CONVERSIONS USING AVAILABLE BLOCKCHAIN OUTPUTS

(71) Applicant: PAYPAL, INC., San Jose, CA (US)

(72) Inventors: Muhammad Saad, Scottsdale, AZ (US); Raoul Johnson, Scottsdale, AZ (US); Jakub Burgis, Scottsdale, AZ (US)

(73) Assignee: PAYPAL, INC., San Jose, CA (US)

( * ) Notice: Subject to any disclaimer, the term of this patent is extended or adjusted under 35 U.S.C. 154(b) by 354 days.

(21) Appl. No.: 17/697,786

(22) Filed: Mar. 17, 2022

(65) Prior Publication Data

US 2023/0298005 A1     Sep. 21, 2023

(51) Int. Cl.
　*G06Q 20/36*　　　(2012.01)
　*G06Q 20/40*　　　(2012.01)
(52) U.S. Cl.
　CPC ....... *G06Q 20/367* (2013.01); *G06Q 20/4016* (2013.01); *G06Q 2220/00* (2013.01)
(58) Field of Classification Search
　CPC ............. G06Q 20/367; G06Q 20/4016; G06Q 2220/00
　See application file for complete search history.

(56) References Cited

U.S. PATENT DOCUMENTS 10,361,853 B2    7/2019  Castagna et al.
11,200,569 B1   12/2021  James et al.

(Continued)

FOREIGN PATENT DOCUMENTS

WO      2020104961 A1    5/2020
WO      2020124199 A1    6/2020

OTHER PUBLICATIONS

Gudgeon et al. "Sok: Layer-two blockchain protocols." Financial Cryptography and Data Security: 24th International Conference, FC 2020. Retrieved on Aug. 18, 2023 (Aug. 18, 2023) from <https://link.springer.com/chapter/10.1007/978-3-030-51280-4_12> entire document.

(Continued)

*Primary Examiner* — Patrick Mcatee
*Assistant Examiner* — Zesheng Xiao
(74) *Attorney, Agent, or Firm* — Haynes and Boone, LLP

(57)　　　　　ABSTRACT

Methods and systems described herein may implement blockchain cryptocurrency transactions in a variety of environments. An online transaction processor may provide operations for cryptocurrency conversions. The transaction processor may detect that a user is involved in a cryptocurrency transaction with another entity, which is requested to be processed using an amount of cryptocurrency and using an off-chain amount of the cryptocurrency. The transaction processor may determine that the entity does not have a digital wallet, node, or the like on a layer two network to receive and/or process the off-chain balance for the cryptocurrency. The transaction processor may then, after a risk assessment, determine that the user may access the amount of the cryptocurrency from an on-chain balance available to a digital wallet of the cryptocurrency. The transaction processor may make that on-chain amount available and may request repayment via the user's off-chain balance.

20 Claims, 16 Drawing Sheets

(56) References Cited

U.S. PATENT DOCUMENTS

| | | | |
|---|---|---|---|
| 11,475,442 B1 | 10/2022 | James et al. | |
| 11,522,700 B1 | 12/2022 | Auerbach et al. | |
| 11,922,403 B2 | 3/2024 | Dalton | |
| 2014/0314090 A1 | 10/2014 | Zheng et al. | |
| 2015/0262171 A1 | 9/2015 | Langschaedel et al. | |
| 2016/0071096 A1 | 3/2016 | Rosca | |
| 2017/0046806 A1 | 2/2017 | Haldenby et al. | |
| 2017/0317833 A1 | 11/2017 | Smith et al. | |
| 2018/0101848 A1 | 4/2018 | Castagna et al. | |
| 2018/0218364 A1* | 8/2018 | Cantrell | G06Q 20/36 |
| 2019/0057362 A1* | 2/2019 | Wright | G06F 16/27 |
| 2019/0057386 A1* | 2/2019 | Fazeli | G06Q 40/03 |
| 2019/0066065 A1 | 2/2019 | Wright et al. | |
| 2019/0188701 A1* | 6/2019 | Parsons | H04L 9/14 |
| 2019/0299105 A1 | 10/2019 | Knight et al. | |
| 2019/0303888 A1 | 10/2019 | Hamasni et al. | |
| 2020/0143466 A1* | 5/2020 | Wu | H04L 9/3239 |
| 2020/0225643 A1* | 7/2020 | Tugbo | G05B 19/4183 |
| 2020/0258152 A1 | 8/2020 | Naggar et al. | |
| 2020/0280433 A1 | 9/2020 | Wright et al. | |
| 2021/0012332 A1 | 1/2021 | Ow et al. | |
| 2021/0168044 A1* | 6/2021 | Ogawa | H04L 41/12 |
| 2022/0036354 A1 | 2/2022 | Zhang et al. | |
| 2022/0038284 A1* | 2/2022 | Naqvi | G16H 10/60 |
| 2022/0045867 A1 | 2/2022 | Beery et al. | |
| 2022/0076246 A1 | 3/2022 | Griffin et al. | |
| 2022/0122062 A1 | 4/2022 | Mayblum et al. | |
| 2022/0138843 A1 | 5/2022 | Lounegov | |
| 2023/0186285 A1* | 6/2023 | Mawson | G06Q 20/381 |
| | | | 705/40 |

OTHER PUBLICATIONS

International Search Report and Written Opinion for Application No. PCT/US2023/015015 mailed on Sep. 22, 2023, 12 pages.

International Preliminary Report on Patentability for Application No. PCT/US2022/071397 mailed on Oct. 12, 2023, 11 pages.

International Preliminary Report on Patentability for Application No. PCT/US2023/015015, mailed on Sep. 26, 2024, 10 pages.

International Search Report and Written Opinion for Application No. PCT/US2022/71397 mailed on Aug. 2, 2022, 23 pages.

Invitation to Pay Additional Fees and, Where Applicable, Protest Fee for Application No. PCT/US2022/071397 mailed on Jun. 3, 2022, 2 pages.

Griffi A.M., et al., "Method For Transferring Cryptographic Tokens, Involves Sending Number Of Internal Cryptographic Tokens Drawn From Float To Wallet Of User Using Transaction Recorded On Blockchain Such That Float Of Tokens Is Obtained In Earlier Transaction," Jun. 25, 2020, 42 pages.

Walgenbach S.L., "System For Facilitating Conversion Of Fiat Currency Amount To Cryptocurrency Amount, Has Processor Module Provided In Communication With Cryptocurrency-fiat Currency Exchange For Determining Cryptocurrency-fiat Current Exchange Rate," May 28, 2020, 133 pages.

Anonymous: "Composable Finance Whitepaper," Jan. 31, 2022 (Jan. 31, 2022), XP093326317, Retrieved from the Internet: URL:https://web.archive.org/web/20220131115013/http://paper.composable.finance/ [retrieved on Oct. 17, 2025].

Panos et al. "The Composable Finance Mosaic Bridge and Liquidity Forecasting", LAK22: 12th International Learning Analytics and Knowledge Conference, ACMPUB27, New York, NY, USA, Feb. 24, 2022 (Feb. 24, 2022), pp. 115-125, XP098286747, DOI: 10.1145/3523181.3523198, ISBN: 978-1-4503-9278-5.

Papadis, Nikolaos et al. "Blockchain-Based Payment Channel Networks: Challenges and Recent Advances," IEEE Access, IEEE, USA, vol. 8, Dec. 21, 2020 (Dec. 21, 2020), pp. 227596-227609, XP011826992, DOI: 10.1109/ACCESS.2020.3046020 [retrieved on Dec. 29, 2020].

Extended European Search Report, Application No. EP23771265.8, Oct. 28, 2025, 8 pages.

* cited by examiner

400

600

601

700

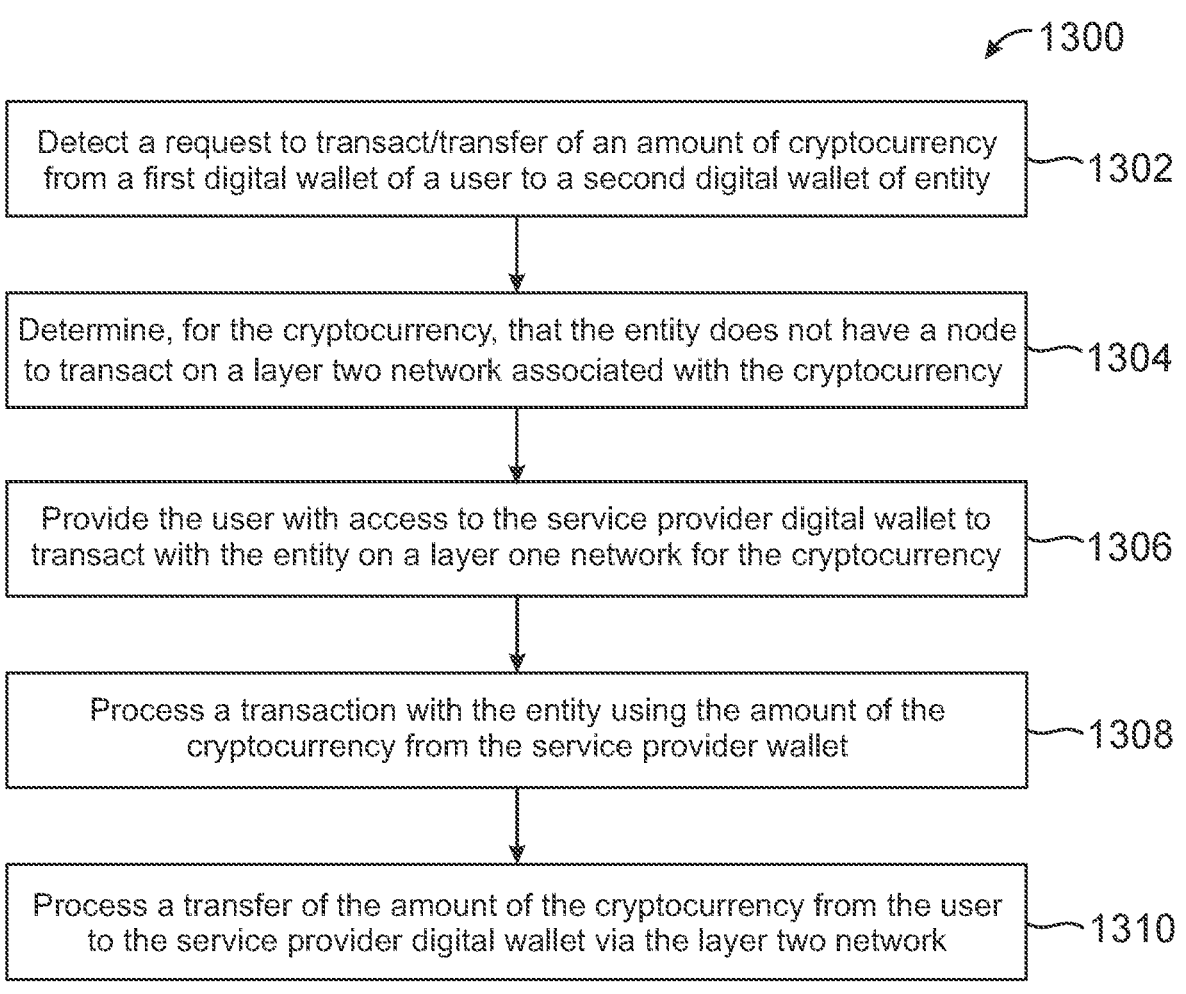

1300

Detect a request to transact/transfer of an amount of cryptocurrency from a first digital wallet of a user to a second digital wallet of entity ~1302

Determine, for the cryptocurrency, that the entity does not have a node to transact on a layer two network associated with the cryptocurrency ~1304

Provide the user with access to the service provider digital wallet to transact with the entity on a layer one network for the cryptocurrency ~1306

Process a transaction with the entity using the amount of the cryptocurrency from the service provider wallet ~1308

Process a transfer of the amount of the cryptocurrency from the user to the service provider digital wallet via the layer two network ~1310

FIG. 13

MULTI-LAYER CRYPTOCURRENCY CONVERSIONS USING AVAILABLE BLOCKCHAIN OUTPUTS

TECHNICAL FIELD

The present disclosure generally relates to blockchain technology and hardware and software related thereto. More specifically, the present disclosure relates to systems and methods for implementing blockchain in a variety of environments, including cryptocurrency conversions.

BACKGROUND

Users may utilize online electronic transaction processors to process transactions between end users as well as exchange and transfer funds. This may include transactions at physical merchant locations with real-world merchants, as well as online transactions on digital merchant marketplaces and the like. Users may have available cryptocurrency, but that cryptocurrency may not be accepted by certain merchants and/or merchants may only interact with certain network layers utilized by the cryptocurrency protocol for transaction processing. For example, Bitcoin may use a layer one network for transaction processing, where Bitcoin transactions on the layer one network are used to record and persist cryptocurrency transactions on a blockchain ledger for the cryptocurrency. However, the layer one network may be more inefficient and/or require longer transaction processing times for miners to verify and record the individual blocks on the blockchain. However, a layer two network for the cryptocurrency, such as a Lightning network for Bitcoin, may reside on top of the layer one network and process transactions more efficiently and/or faster. Users and/or merchants may therefore have available digital wallets, cryptocurrency, and/or processing nodes on different networks based on different preferences and policies. Thus, users may want to process a transaction with a merchant or other entity (e.g., a transfer with another user), but may not have available cryptocurrency on a certain network layer. When attempting to convert, transfer, and/or process transactions between different network layers and/or cryptocurrencies, significant time and data processing resources may be required and consumed. Thus, it is desirable to provide users with faster, more efficient, and more reliable cryptocurrency transaction processing between different cryptocurrency network layers.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings:

FIG. 13 illustrates a flowchart for multi-layer cryptocurrency conversions using available blockchain outputs, according to an embodiment.

DETAILED DESCRIPTION

Figure 1:
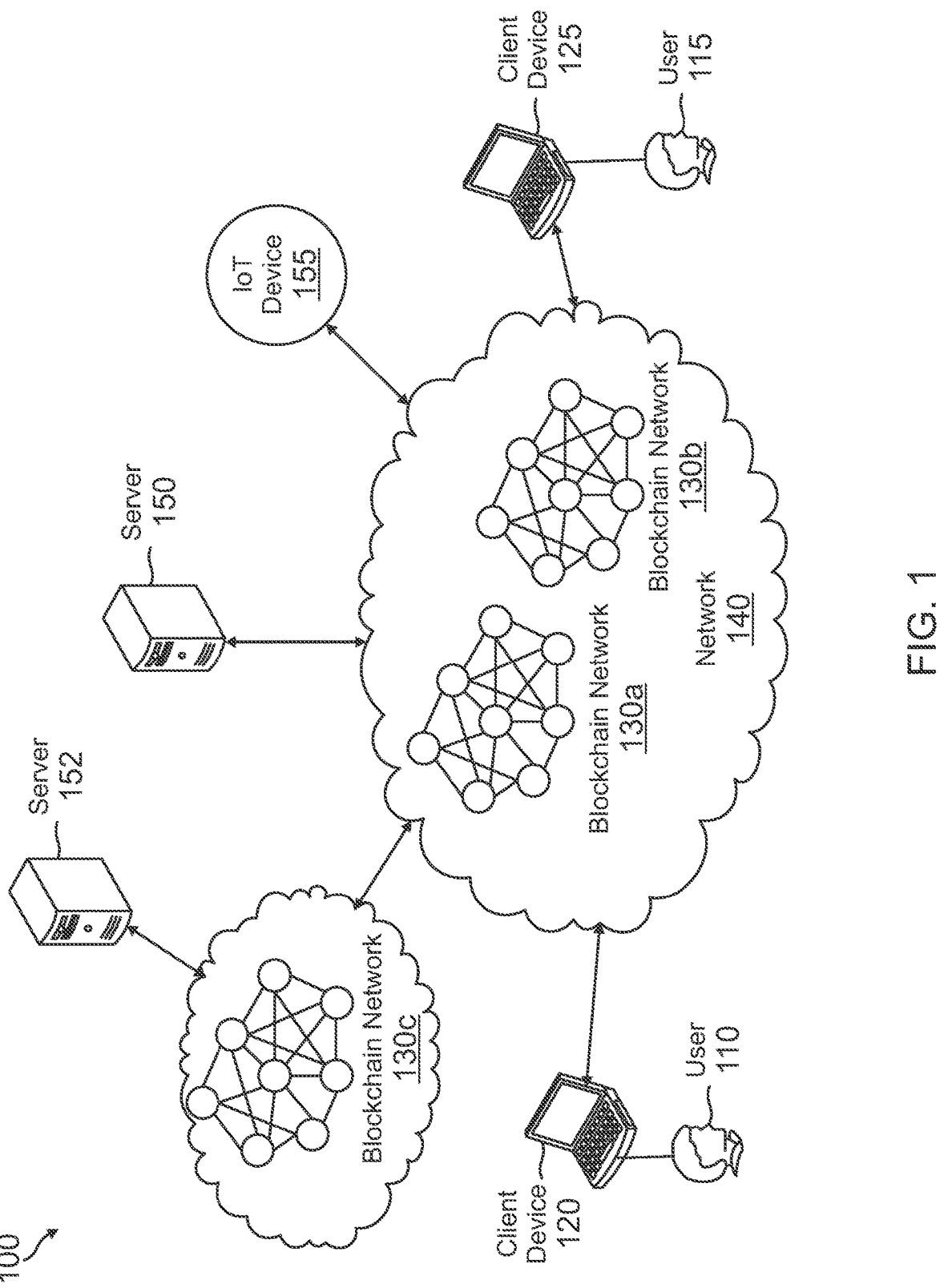
FIG. 1 illustrates an environment of an exemplary computing architecture for facilitating one or more blockchain based transactions, according to an embodiment.

In the following description of the various embodiments, reference is made to the accompanying drawings identified above and which form a part hereof, and in which is shown by way of illustration various embodiments in which aspects described herein may be practiced. It is to be understood that other embodiments may be utilized, and structural and functional modifications may be made, without departing from the scope described herein. Various aspects are capable of other embodiments and of being practiced or being carried out in various different ways.

In its broadest sense, blockchain refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others the distributed ledger represents each transaction where units of the cryptocurrency are transferred between entities. For example, using a digital currency exchange, a user may buy any value of digital currency or exchange any holdings in digital currencies into worldwide currency or other digital currencies. Each transaction can be verified by the distributed ledger and only verified transactions are added to the ledger. The ledger, along with many aspects of blockchain, may be referred to as "decentralized" in that a central authority is typically not present. Because of this, the accuracy and integrity of the ledger cannot be attacked at a single, central location. Modifying the ledger at all, or a majority of, locations where it is stored is made difficult so as to protect the integrity of the ledger. This is due in large part because individuals associated with the nodes that make up the peer-to-peer network have a vested interest in the accuracy of the ledger.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is assured. In some embodiments described herein, blockchains and cryptocurrency may be utilized to provide access to and/or conversions of cryptocurrency amounts between different network layers available to a cryptocurrency protocol. A value of a cryptocurrency or other digital asset (e.g., virtual currencies (e.g., credit card or bank points, virtual assets, NFTs, loyalty or reward points, etc.), and the like may be available on different processing and recording networks, such as different distributed ledger networks and transaction processing/ recording networks. This may occur because different users, merchants, other entities, service providers, and/or digital wallet providers and holders may choose to conduct transactions on different networks for distributed blockchain and record processing and recording. Where the primary layer, such as the layer one network, incurs significant processing cost and/or time when requesting, signing transactions, relaying the transaction, performing mining and/or other proof of work to calculate and verify blockchain blocks or other records, and making available the cryptocurrency to another user, users may elect to use a secondary network, such as a layer two network, which may provide faster and/or more efficient blockchain calculations and verification, for example, by batching processing, requiring amount commitments by transaction participants, not requiring approval by all nodes, and the like. However, by utilizing multi-layer cryptocurrency transactions, users, merchants, and other entities may have digital wallets, processing nodes, and the like on different layers and/or with different amounts of available cryptocurrency to transact.

In this regard, online transaction processors, such as PayPal® or Venmo®, may be used to process transactions electronically using cryptocurrency, virtual currency, and the like, which may provide users with the functionality to convert or sell cryptocurrency available to or held by the user in order to process a transaction through different network layers associated with a cryptocurrency. In order to provide functionality to a user on different network layers, the transaction processor may utilize a digital wallet having cryptocurrency amounts, unspent transaction outputs (UTXOs), and the like on different layers of the multi-layer cryptocurrency protocol. The transaction processor may receive a request for processing a transaction and/or making a transfer from a user to an entity (e.g., another user, merchant, or the like) using cryptocurrency available to that user. The cryptocurrency may be available to the user via a digital wallet and through a particular network layer, such as a layer two Lightning network for Bitcoin. This may be faster for the user to process a transaction, such as to purchase coffee or food from a merchant. The transaction processor may determine that the entity corresponding to the transaction participant does not have a node on that corresponding network. Thus, the transaction processor may make a corresponding amount of cryptocurrency available to the user from the transaction processor's digital wallet for transacting with the entity on another network layer of the cryptocurrency protocol, such as a primary layer one Bitcoin network. This availability may be based on a risk assessment of the user, the user's digital wallet, transaction, and/or entity. Once made available, the user may process a transaction using the available cryptocurrency from the transaction processor's digital wallet, and then may be required to reimburse and/or transfer the same or similar amount of cryptocurrency to the transaction processor's digital wallet from the user and/or the user's digital wallet.

For electronic transaction processing and digital payments made using cryptocurrency balances and cryptocurrency processing services, an online service provider (e.g., an online transaction processor, such as PAYPAL®) may provide account services to users of the online service provider, as well as other entities requesting the services. A user wishing to establish the account may first access the online service provider and request establishment of an account. An account and/or corresponding authentication information with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may be required to provide financial information, including payment card (e.g., credit/debit card) information, bank account information, gift card information, benefits/incentives, and/or financial investments. This information may be used to process transactions for items and/or services including purchases associated with a location visited by a user that is associated with an edge computing storage. In some embodiments, the account creation may establish account funds and/or values, such as by transferring fiat currency, virtual currency, and/or cryptocurrency into the account and/or establishing a credit limit and corresponding credit value that is available to the account and/or card. Therefore, this may include loading cryptocurrency to the account, digital wallet, and/or online cryptocurrency exchange or another platform, as well as integrating a cryptocurrency wallet (e.g., an offline cold wallet and/or wallet on another cryptocurrency exchange platform). The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and other transaction processing services. Once the account of the user is established with the service provider, the user may utilize the account via one or more computing devices, such as a personal computer, tablet computer, mobile smart phone, or the like.

A user may utilize cryptocurrency and a digital cryptocurrency wallet to process payments through a blockchain protocol and network associated with the cryptocurrency. For example, a user may make a cryptocurrency payment to another user or otherwise transfer cryptocurrency between digital wallets, nodes, or users, which transfers ownership of the cryptocurrency. When persisting the transaction to a digital ledger associated with the blockchain protocol, miners may be used to verify the transaction, broadcast on the network, and cause the transaction to be recorded in a block on the corresponding blockchain. For example, with a cryptocurrency such as Bitcoin, transactions and Bitcoin transfers require resolution by updating blocks in a distributed ledger on a distributed blockchain network over many computing devices, nodes, servers, and the like. Each block may refer to a ledger record or block that is designed to record the transaction on the distributed ledger for proof of the transactions. Miners may be used to verify and record the individual blocks on the blockchain, which requires time, computing resources, and network bandwidth to broadcast and verify the transactions on recipient nodes after computing some value, such as a nonce. Thus, each block requires a proof of work, which is used to verify and accept each block on the blockchain network. This may generally refer to a layer one network that is used for cryptocurrency transactions and other blockchain recordation.

However, the cryptocurrency may provide additional network layers, which may reside on a different network on top of the layer one blockchain network for the cryptocurrency. For example, a layer two network, such as a Lightning network, may reside on top of a layer one network used to process and record cryptocurrency transactions between users. This may allow cryptocurrency transactions to be off-chain transactions that may not necessarily require all of the requirements of transaction processing and recordation on the layer one network. This allows for faster, more efficient, and less resource intensive transaction processing, as well as reducing transaction costs to cryptocurrency miners, by using the layer two network instead of going through a layer one network (e.g., the cryptocurrency's layer one network for blockchain recordation). The layer two network transactions may then be resolved through fewer transactions, such as a single transaction for channel creation on the layer two network and a second transaction for channel closure and settlement of the corresponding transactions on the layer two network (e.g., by batching and/or combining multiple transactions on the layer two network that are associated with the channel creation and closure/settlement). These may be guaranteed through smart contracts, including hashed time-lock contracts (HTLC), which allows for cryptocurrency to be available on different networks for different transaction costs. Thus, users may have available cryptocurrency that is allocated on a specific network based on whether the currency has been used for on-chain or off-chain transactions and other parameters.

In this regard, a user may request a transaction processing, conversion, and/or transfer of an amount of cryptocurrency between the user and another entity, such as another user, a merchant, and/or another service provider. This may be received by a transaction processor or other online service provider that provides transaction processing using cryptocurrency over a network, including transaction processors that may include and/or utilize cryptocurrency exchange platforms. The transaction processor may determine available cryptocurrency for the user and/or network layers where that cryptocurrency is available for a transaction and/or may receive a designation of a particular cryptocurrency and network layer. For example, the user may select Bitcoin for a transaction on a layer two network to provide a real-time or near real-time payment to a merchant for a product, service, or other item. The transaction processor may then determine whether the user and the entity can conduct the transaction with the designated cryptocurrency and on the designated network layer for the cryptocurrency's blockchain protocol. If the user and entity can conduct the transaction, the transaction may be processed, recorded, and persisted in one or more blockchain records. However, if the entity does not have a node, digital wallet address, and/or digital wallet component on the selected network layer, such as a node on a layer two Lightning network for Bitcoin, the transaction processor may then determine the user and entity are not capable of transacting and a conversion or exchange.

This may include providing the user with access to cryptocurrency on another network layer (e.g., the layer one network) from a digital wallet of the transaction processor to conduct the transaction with the entity, while the user then provides a transfer, repayment, or refund from the user's digital wallet on another network layer (e.g., the layer two network) to the transaction processor's digital wallet. Thus, the transaction processor may determine corresponding digital wallets and/or cryptocurrency transaction nodes of the user, the entity, and the transaction processor, as well as available cryptocurrency, UTXOs of the cryptocurrency, and the like that are available to those digital wallets. The transaction processor may further determine an amount of cryptocurrency required for the transaction and compare to the available cryptocurrency balances of the digital wallets of the user and transaction processor. Thus, the transaction processor may determine an amount to provide access to, expose private keys for UTXOs, and/or enable the user to conduct the transaction with the digital wallet of the transaction processor.

When determining the amount to provide to the user and/or whether to provide access to the amount to the user from the transaction processor's digital wallet, the transaction processor may run a risk analysis of the user, the requested transaction, the user's and/or the entity's digital wallets, and the like. The transaction processor may utilize one or more intelligent data models, such as risk analysis machine learning (ML) models, in order to determine whether the transaction is "safe" or "risky". For example, a risk analysis model and/or engine may determine an output score, value, or other prediction of risk based on one or more of the user, the requested transaction, the user's digital wallet, and/or the entity's digital wallet, which may be compared to a threshold risk score or analysis. In some embodiments, where UTXOs available in the transaction processor's digital wallet may not properly correspond to the amount required for the transaction, such as if the transaction processor's UTXO may correspond to a larger amount of cryptocurrency and would therefore provide an excess of available cryptocurrency to the user. In such embodiments, the risk score may be run to determine a likelihood of fraud and/or repayment by the user before exposing private keys of such UTXOs to the user. Further, the user may be performing a group transaction, where the user may assume responsibility for payment and therefore a risk analysis is run on the user, or multiple users may be engaged in the transaction, and each require a corresponding risk analysis.

If the user passes the risk analysis and/or if the transaction processor determines to make the amount of cryptocurrency available to the user on the corresponding network layer that allows for transacting with the entity, the transaction processor may provide access to the user to a certain amount of cryptocurrency available in the transaction processor's digital wallet. By providing access, the user may be provided with private keys that allow for use of and/or transacting using the amount of cryptocurrency from the transaction processor's digital wallet. The user may then request transaction processing with the entity using the available amount of the cryptocurrency from the transaction processor's digital wallet, which may allow for transaction processing and/or transfer of the amount of the cryptocurrency to the entity's digital wallet or other node on the corresponding network layer. The transaction processor and/or entity may then perform transaction processing, cryptocurrency exchange recordation, and the like, which may complete the transaction. In some embodiments, the user may be performing a group transaction, where the user is assuming responsibility for payment or multiple users are individually paying. Where the user assumes responsibility, the transaction processor may process a transaction with the entity on the user's behalf for the amount of cryptocurrency the transaction processor has made available to the user via the transaction processor's digital wallet and on the corresponding network layer (e.g., layer one network). However, where multiple users are paying, each transaction may be handled individually with the entity's digital wallet from cryptocurrency made available to the users via the transaction processor's digital wallet.

In synchronization with or shortly after (e.g., in real-time or near real-time) paying or transferring the cryptocurrency from the transaction processor's digital wallet to the entity's digital wallet on the layer one network or another network layer, the transaction processor may then initiate a transfer, reimbursement, and/or repayment of the amount of the cryptocurrency from the user's digital wallet to the transaction processor's digital wallet on the other network layer, such as via the layer two Lightning network where the user has available cryptocurrency amounts. The transaction processor may then request, initiate, and/or process a transfer of the amount of the cryptocurrency from the user's digital wallet to the transaction processor's digital wallet so that the transaction processor receives the amount of cryptocurrency to recover and repay the amount the transaction processor provided the user with access to. If the user does not perform repayment, a risk score and/or assessment of the user may be updated, and fraud recovery operations may be implemented. This may occur where the user was provided with an excess of cryptocurrency from UTXOs of the transaction processor, but did not timely repay the amount the user accessed and/or used.

Where the transaction processor acts as the digital wallet provider and/or cryptocurrency exchange platform on behalf of the user (e.g., a hot wallet provider holding digital assets on behalf of the user), the transaction processor may have or receive an opt-in to automatically process the transfer and reimbursement of the amount of the cryptocurrency from the user's digital wallet to the transaction processor's digital wallet. In this manner, the transaction processor may enable users and entities to conduct transactions with multi-layer network cryptocurrency protocols, which provides faster, more efficient, and more widely available processing of cryptocurrency and use of blockchain protocols. This further improves the blockchain and cryptocurrency protocols that utilize different network layers for different types and protocols for cryptocurrency processing recordation and persistence in blockchain records.

Implementations of the present disclosure will now be described in detail with reference to the accompanying Figures. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computing Architecture

As discussed above, the distributed ledger in a blockchain framework is stored, maintained, and updated in a peer-to-peer network. In one example the distributed ledger maintains a number of blockchain transactions. FIG. 1 shows an example system 100 for facilitating a blockchain transaction. The system 100 includes a first client device 120, a second client device 125, a first server 150, a second server 152, and an Internet of Things (IoT) device 155 interconnected via a network 140. The first client device 120, the second client device 125, the first server 150, and/or the second server 152 may be a computing device 1105 described in more detail with reference to FIG. 11. The IoT device 155 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices along with connectivity hardware configured to connect and exchange data. The network 140 may be any of a variety of available networks, such as the Internet, and represents a worldwide collection of networks and gateways to support communications between devices connected to the network 140. The system 100 may also comprise one or more distributed or peer-to-peer (P2P) networks, such as a first, second, and third blockchain networks 130a-c (generally referred to as blockchain networks 130). As shown in FIG. 1, the network 140 may comprise the first and second blockchain networks 130a and 130b. The third blockchain network 130c may be associated with a private blockchain as described below with reference to FIG. 2 and is connected to one or more servers, such as the server 152, and is thus, shown separately from the first and second blockchain networks 130a and 103b. Each blockchain network 130 may comprise a plurality of interconnected devices (or nodes) as described in more detail with reference to FIG. 2. As discussed above, a ledger, or blockchain, is a distributed database for maintaining a growing list of records comprising any type of information. A blockchain, as described in more detail with reference to FIG. 3, may be stored at least at multiple nodes (or devices) of the one or more blockchain networks 130.

In one example, a blockchain based transaction may generally involve a transfer of data or value between entities, such as the first user 110 of the first client device 120 and the second user 115 of the second client device 125 in FIG. 1. Each of the servers 150 and 152 may include one or more applications, for example, a transaction application configured to facilitate the transaction between the entities by utilizing a blockchain associated with one of the blockchain networks 130. As an example, the first user 110 may request or initiate a transaction with the second user 115 via a user application executing on the first client device 120. The transaction may be related to a transfer of value or data from the first user 110 to the second user 115. The first client device 120 may send a request of the transaction to the server 150. The first server 150 and/or the second server 152 may send the requested transaction to one of the blockchain networks 130 to be validated and approved as discussed below.

Blockchain Network

Figure 2:
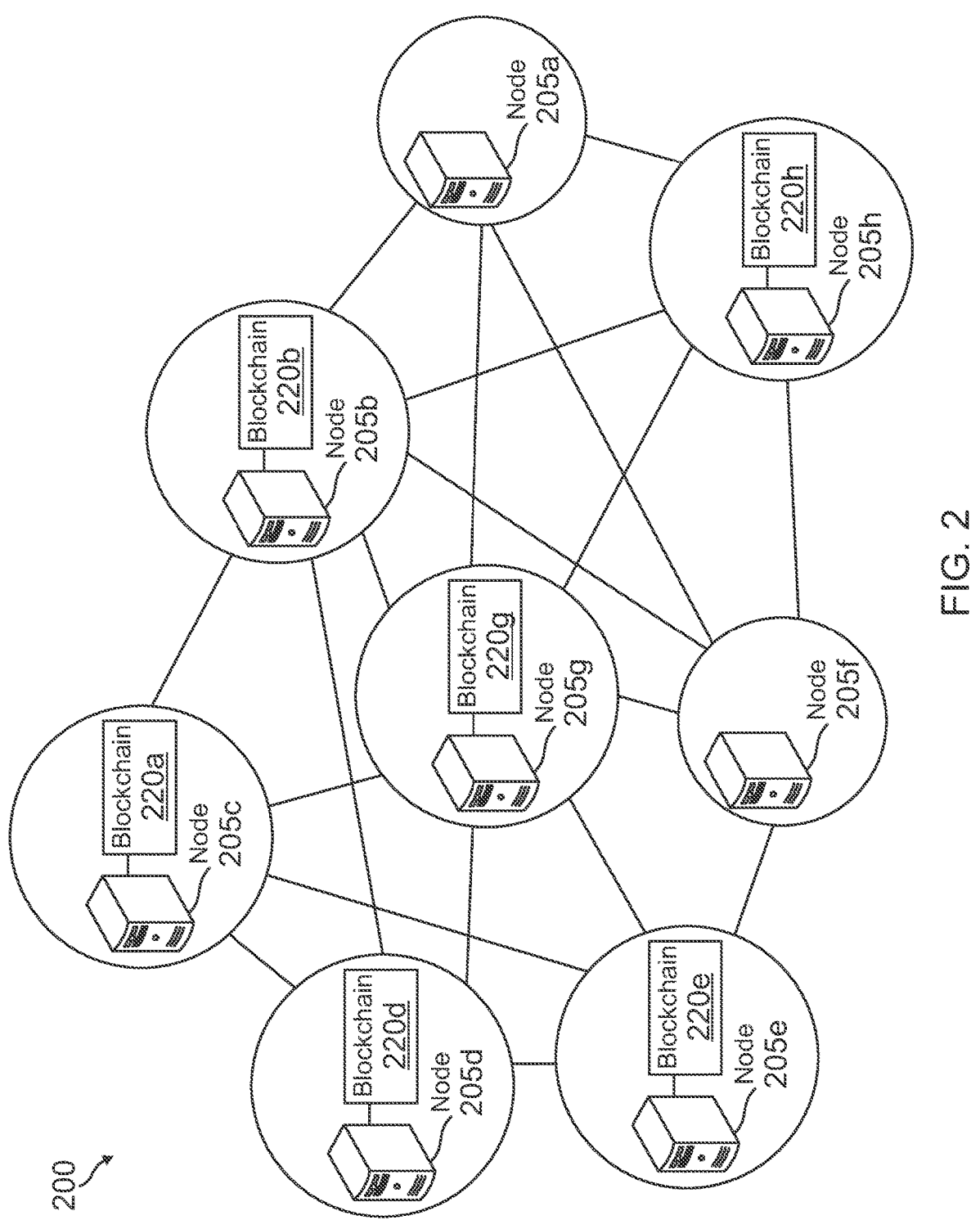
FIG. 2 illustrates an environment of an exemplary blockchain network, according to an embodiment.
Figure 3:
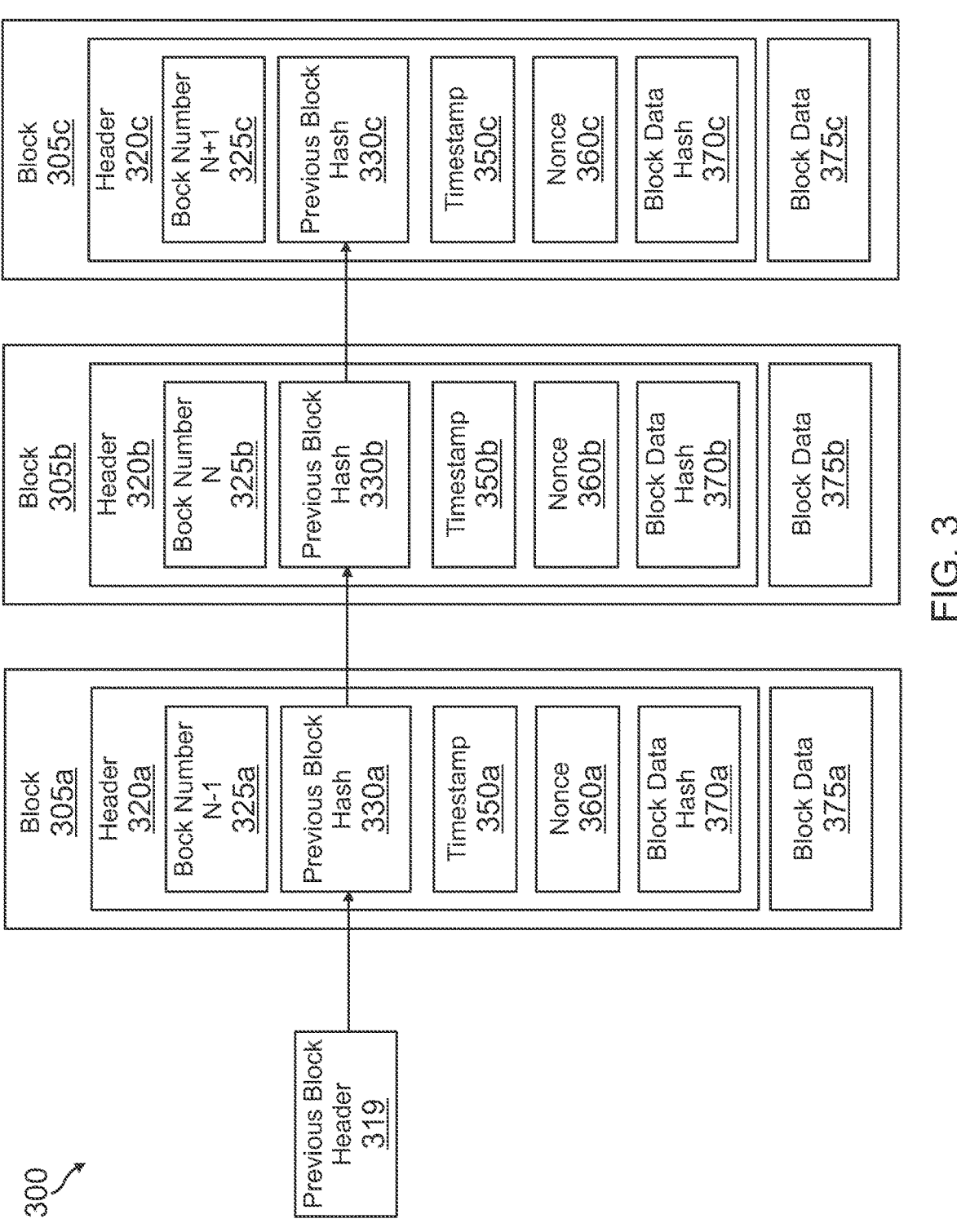
FIG. 3 illustrates a block diagram of an exemplary blockchain, according to an embodiment.

FIG. 2 shows an example blockchain network 200 comprising a plurality of interconnected nodes or devices 205a-h (generally referred to as nodes 205). Each of the nodes 205 may comprise a computing device 1105 described in more detail with reference to FIG. 11. Although FIG. 2 shows a single device 205, each of the nodes 205 may comprise a plurality of devices (e.g., a pool). The blockchain network 200 may be associated with one or more blockchains 220*a-h* (generally referred to as blockchain 220). Some or all of the nodes 205 may replicate and save an identical copy of the blockchain 220. For example, FIG. 3 shows that the nodes 205*b-e* and 205*g-h* store copies of the blockchain 220. The nodes 205*b-e* and 205*g-h* may independently update their respective copies of the blockchain 220 as discussed below.

Blockchain Node Types

Blockchain nodes, for example, the nodes 205, may be full nodes or lightweight nodes. Full nodes, such as the nodes 205*b-e* and 205*g-h*, may act as a server in the blockchain network 200 by storing a copy of the entire blockchain 220 and ensuring that transactions posted to the blockchain 220 are valid. The full nodes 205*b-e* and 205*g-h* may publish new blocks on the blockchain 220. Lightweight nodes, such as the nodes 205*a* and 205*f*, may have fewer computing resources than full nodes. For example, IoT devices often act as lightweight nodes. The lightweight nodes may communicate with other nodes 205, provide the full nodes 205*b-e* and 205*g-h* with information, and query the status of a block of the blockchain 220 stored by the full nodes 205*b-e* and 205*g-h*. In this example, however, as shown in FIG. 2, the lightweight nodes 205*a* and 205*f* may not store a copy of the blockchain 220 and thus, may not publish new blocks on the blockchain 220.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization. Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals. Moreover, read permissions for the blockchain 220 may be public or restricted while write permissions may be restricted to a controlling or authorized entity.

Blockchain

As discussed above, a blockchain 220 may be associated with a blockchain network 200. FIG. 3 shows an example blockchain 300. The blockchain 300 may comprise a plurality of blocks 305*a*, 305*b*, and 305*c* (generally referred to as blocks 305). The blockchain 300 comprises a first block (not shown), sometimes referred to as the genesis block. Each of the blocks 305 may comprise a record of one or a plurality of submitted and validated transactions. The blocks 305 of the blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205*b-e* and 205*g-h*, as a file or in a database.

Blocks

Each of the blocks 305 may comprise one or more data fields. The organization of the blocks 305 within the blockchain 300 and the corresponding data fields may be implementation specific. As an example, the blocks 305 may comprise a respective header 320*a*, 320*b*, and 320*c* (generally referred to as headers 320) and block data 375*a*, 375*b*, and 375*c* (generally referred to as block data 375). The headers 320 may comprise metadata associated with their respective blocks 305. For example, the headers 320 may comprise a respective block number 325*a*, 325*b*, and 325*c*. As shown in FIG. 3, the block number 325*a* of the block 305*a* is N−1, the block number 325*b* of the block 305*b* is N, and the block number 325*c* of the block 305*c* is N+1. The headers 320 of the blocks 305 may include a data field comprising a block size (not shown).

The blocks 305 may be linked together and cryptographically secured. For example, the header 320*b* of the block N (block 305*b*) includes a data field (previous block hash 330*b*) comprising a hash representation of the previous block N−1's header 320*a*. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320*c* of the block N+1 (block 305*c*) includes a data field (previous block hash 330*c*) comprising a hash representation of block N's (block 305*b*) header 320*b*.

The headers 320 of the blocks 305 may also include data fields comprising a hash representation of the block data, such as the block data hash 370*a-c*. The block data hash 370*a-c* may be generated, for example, by a Merkle tree and by storing the hash or by using a hash that is based on all of the block data. The headers 320 of the blocks 305 may comprise a respective nonce 360*a*, 360*b*, and 360*c*. In some implementations, the value of the nonce 360*a-c* is an arbitrary string that is concatenated with (or appended to) the hash of the block. The headers 320 may comprise other data, such as a difficulty target.

The blocks 305 may comprise a respective block data 375*a*, 375*b*, and 375*c* (generally referred to as block data 375). The block data 375 may comprise a record of validated transactions that have also been integrated into the blockchain 200 via a consensus model (described below). As discussed above, the block data 375 may include a variety of different types of data in addition to validated transactions. Block data 375 may include any data, such as text, audio, video, image, or file, that may be represented digitally and stored electronically.

Blockchain Transaction

In one example, a blockchain based transaction may generally involve a transfer of data or value or an interaction between entities and described in more detail below. Referring back to FIG. 1, the first server 150 and/or the second server 152 may include one or more applications, for example, a transaction application configured to facilitate a blockchain transaction between entities. The entities may include users, devices, etc. The first user 110 may request or initiate a transaction with the second user 115 via a user application executing on the first client device 120. The transaction may be related to a transfer of value or data from the first user 110 to the second user 115. The value or data may represent money, a contract, property, records, rights, status, supply, demand, alarm, trigger, or any other asset that may be represented in digital form. The transaction may represent an interaction between the first user 110 and the second user 115.

Figure 4:
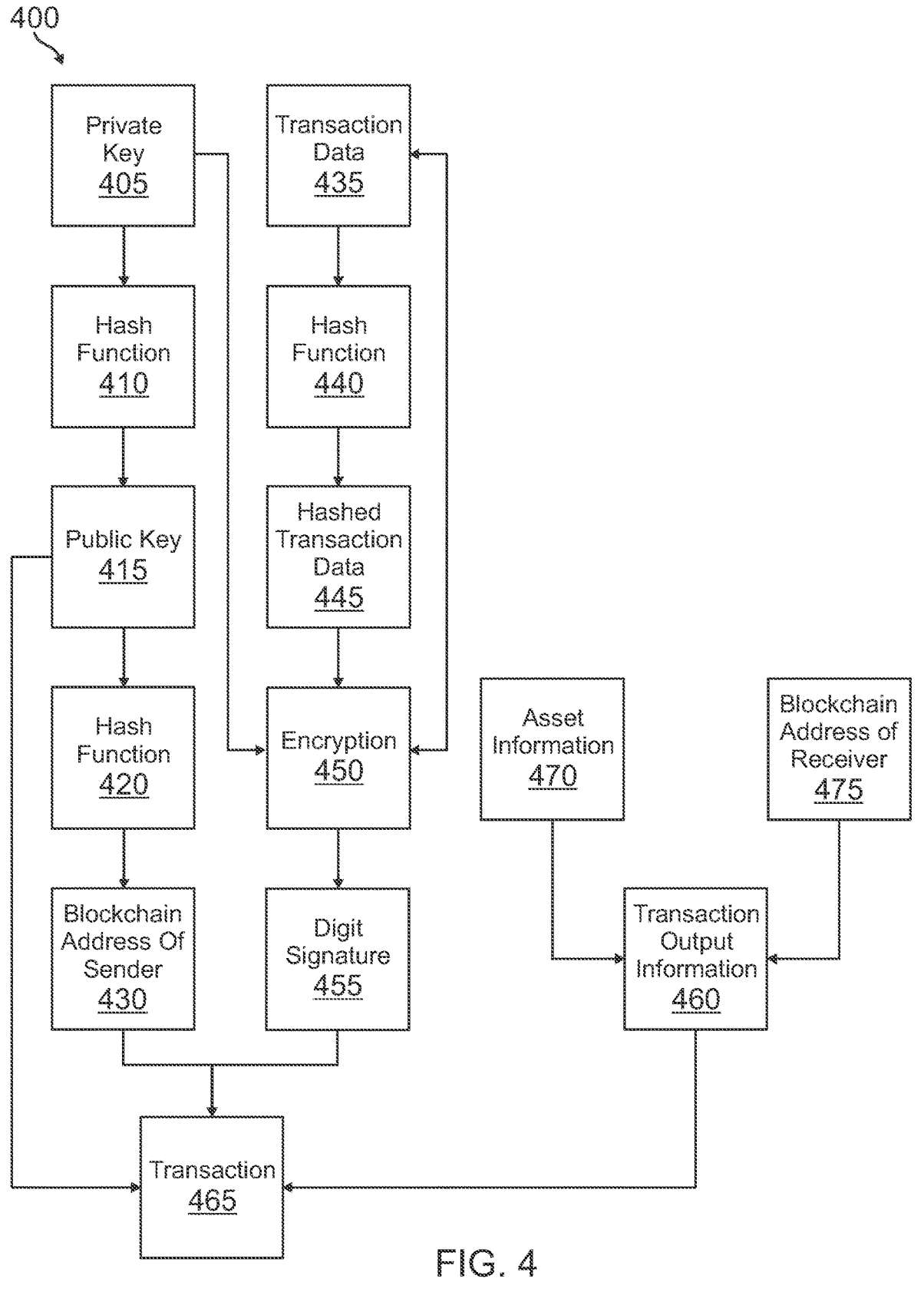
FIG. 4 illustrates a block diagram of an exemplary transaction message, according to an embodiment.

FIG. 4 is a diagram of a transaction 465 generated by the transaction application. The transaction 465 may include a public key 415, a blockchain address 430 associated with the first user 110, a digital signature 455, and transaction output information 460. The transaction application may derive a public key 415 from a private key 405 of the first user 110 by applying a cryptographic hash function 410 to the private key 405. The cryptographic hash function 410 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The transaction application may derive an address or identifier for the first user 110, such as the blockchain address 430, by applying a hash function 420 to the public key 415. Briefly, a hash function is a function that may be used for mapping arbitrary size data to fixed size data. The value may also be referred to as a digest, a hash value, a hash code, or a hash. In order to indicate that the first user 110 is the originator of the transaction 465, the transaction application may generate the digital signature 455 for the transaction data 435 using the private key 405 of the first user 110. The transaction data 435 may include information about the assets to be transferred and a reference to the sources of the assets, such as previous transactions in which the assets were transferred to the first user 110 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first user 110 resulting in the digital signature 455. The transaction output information 460 may include asset information 470 and an address or identifier for the second user 115, such as the blockchain address 475. The transaction 465 may be sent from the first client device 125 to the first server 150.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 110, shown in FIG. 4 as the blockchain address of sender 430, may include an alphanumeric string of characters derived from the public key 415 of the first user 110 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 5:
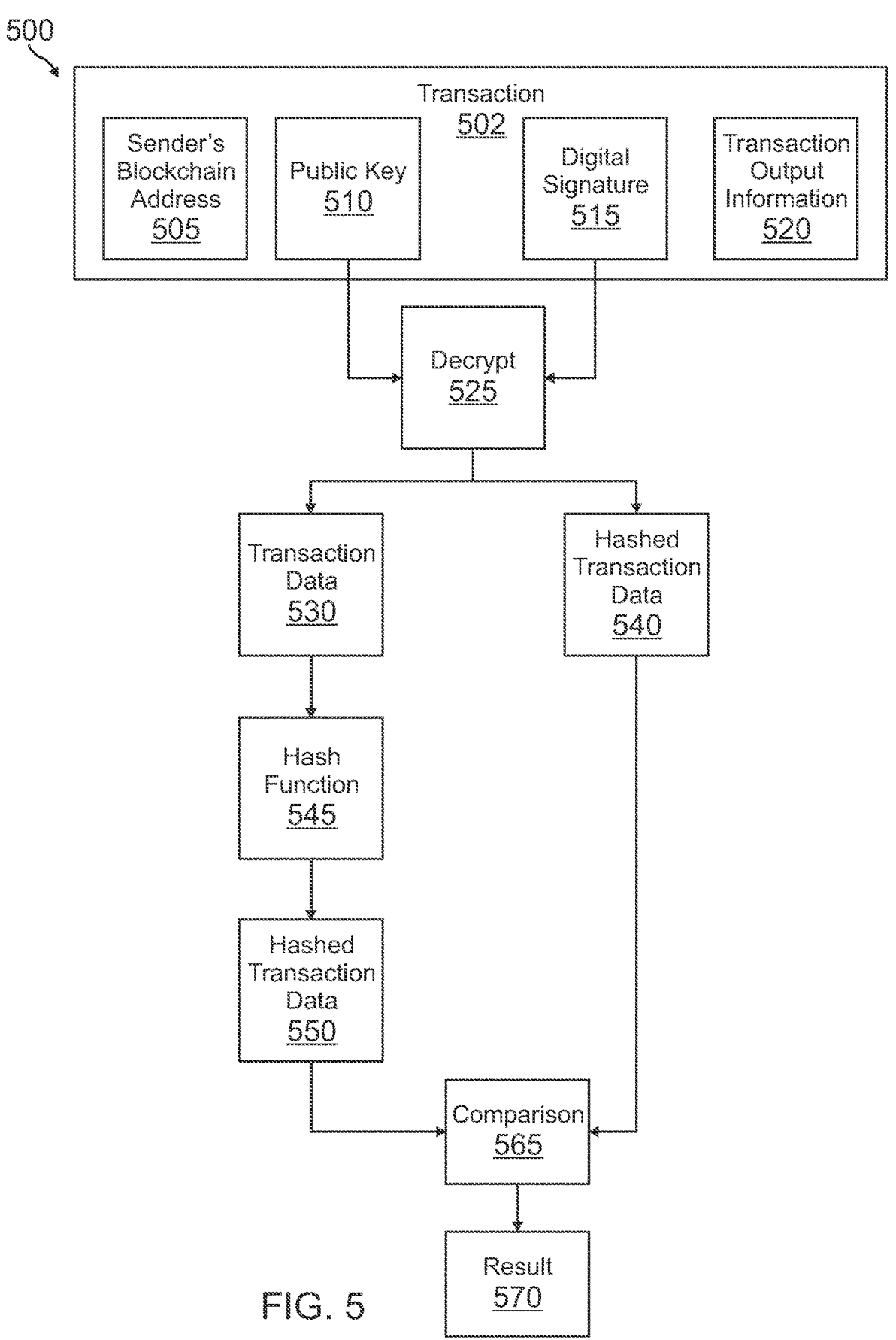
FIG. 5 illustrates a block diagram of an exemplary transaction broadcast the blockchain network, according to an embodiment.

The first server 150 may receive transactions from users of the blockchain network 130. The transactions may be submitted to the first server 150 via desktop applications, smartphone applications, digital wallet applications, web services, or other software applications. The first server 150 may send or broadcast the transactions to the blockchain network 130. FIG. 5 shows an example transaction 502 broadcast by the server 150 to the blockchain network 130. The transaction 502 may be broadcast to multiple nodes 205 of the blockchain network 130. Typically, once the transaction 502 is broadcast or submitted to the blockchain network 130, it may be received by one or more of the nodes 205. Once the transaction 502 is received by the one or more nodes 205 of the blockchain network 130, it may be propagated by the receiving nodes 205 to other nodes 205 of the blockchain network 130.

A blockchain network may operate according to a set of rules. The rules may specify conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcasted to one or more specific nodes based on criteria related to the node's geography, history, reputation, market conditions, docket/delay, technology platform. The rules may be dynamically modified or updated (e.g., turned on or off) to address issues such as latency, scalability and security conditions. A transaction may be broadcast to a subset of nodes as a form of compensation to entities associated with those nodes (e.g., through receipt of compensation for adding a block of one or more transactions to a blockchain).

Transaction Validation—User Authentication and Transaction Data Integrity

Not all the full nodes 205 may receive the broadcasted transaction 502 at the same time, due to issues such as latency. Additionally, not all of the full nodes 205 that receive the broadcasted transaction 502 may choose to validate the transaction 502. A node 205 may choose to validate specific transactions, for example, based on transaction fees associated with the transaction 502. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing user authenticity and transaction data integrity. User authenticity may be established by determining whether the sender indicated by the transaction 502 is in fact the actual originator of the transaction 502. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 502 may be established by determining whether the data associated with the transaction 502 was modified in any way. Referring back to FIG. 4, when the transaction application creates the transaction 465, it may indicate that the first user 110 is the originator of the transaction 465 by including the digital signature 455.

The node 205 may decrypt the digital signature 515 using the public key 510. A result of the decryption may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 may build its own block and add validated transactions to that block. Thus, the blocks of different full nodes 205 may comprise different validated transactions. As an example, a full node 205a may create a first block comprising transactions "A," "B," and "C." Another full node 205b may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access a user's public/private keys may access the user's assets. While the assets may be recorded on the blockchain, the user may not be able to access them without the private key.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, ticket, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a set of rules that are encoded in a smart contract. The person that owns the private key corresponding to the blockchain address may access the tokens at the address. Thus, the blockchain address may represent an identity of the person that owns the tokens. Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

Establishing User Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Publishing and Validating a Block

As discussed above, full nodes 205 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 205 solves the puzzle, it may publish its block to be validated by the validation nodes 205 of the blockchain network 130.

In a proof of work consensus model, a node validates a transaction, for example, by running a check or search through the current ledger stored in the blockchain. The node will create a new block for the blockchain that will include the data for one or more validated transactions (see, e.g., block 375 of FIG. 3). In a blockchain implementation such as Bitcoin, the size of a block is constrained. Referring back to FIG. 3, in this example, the block will include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is less than a preset value. This is achieved through addition of a data value referred to as a nonce 360. Because final hash values cannot be predicted based on its input, it is not possible to estimate an appropriate value for the nonce 360 that will result in a final hash value that is less than the pre-set value. Accordingly, in this embodiment, a computationally-intensive operation is needed at the node to determine an appropriate nonce value through a "brute force" trial-and-error method. Once a successful nonce value is determined, the completed block is published to the blockchain network for validation. If validated by a majority of the nodes in the blockchain network, the completed block is added to the blockchain at each participating node. When a node's block is not added to the blockchain, the block is discarded and the node proceeds to build a new block. The transactions that were in the discarded block may be returned to a queue and wait to be added to a next block. When a transaction is discarded or returned to the queue, the assets associated with the discarded transaction are not lost, since a record of the assets will exist in the blockchain. However, when a transaction is returned to the queue, it causes a delay in completing the transaction. Reducing the time to complete a transaction may be important. A set of blockchain rules, or renumeration/compensation for a node to process the returned transaction may determine how a returned transaction is to be treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcasted to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, a blockchain network may determine which of the full nodes 205 publishes a next block to the blockchain. In a permissionless blockchain network, the nodes 205 may compete to determine which one publishes the next block. A node 205 may be selected to publish its block as the next block in the blockchain based on consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g., the mathematical puzzle described above). The solution serves as "proof" that the node expended an appropriate amount of effort in order to publish the block. The solution may be validated by the full nodes before the block is accepted. The proof of work model, however, may be vulnerable to a 51% attack described below. The proof of stake model is generally less computationally intensive than the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g. in the context of a corporate environment), a hybrid blockchain network may switch to be between completely or partially permissioned and permissionless. The network may switch based on various factors, such as latency, security, market conditions, etc.

Forks

As discussed above, consensus models may be utilized for determining an order of events on a blockchain, such as which node gets to add the next block and which node's transaction gets verified first. When there is a conflict related to the ordering of events, the result may be a fork in the blockchain. A fork may cause two versions of the blockchain to exist simultaneously. Consensus methods generally resolve conflicts related to the ordering of events and thus, prevent forks from occurring. In some cases, a fork may be unavoidable. For example, with a proof of work consensus model, only one of the nodes competing to solve a puzzle may win by solving its puzzle first. The winning node's block is then validated by the network. If the winning node's block is successfully validated by the network, then it will be the next block added to the blockchain. However, it may be the case that two nodes may end up solving their respective puzzles at the same time. In such a scenario, the blocks of both winning nodes may be broadcasted to the network. Since different nodes may receive notifications of a different winning node, the nodes that receive notification of the first node as the winning node may add the first node's block to their copy of the blockchain. Nodes that receive notification of the second node as the winning node may add the second node's block to their copy of the blockchain. This results in two versions of the blockchain or a fork. This type of fork may be resolved by the longest chain rule of the proof of work consensus model. According to the longest chain rule, if two versions of the blockchain exist, then the network the chain with a larger number of blocks may be considered to be the valid blockchain. The other version of the blockchain may be considered as invalid and discarded or orphaned. Since the blocks created by different nodes may include different transactions, a fork may result in a transaction being included in one version of the blockchain and not the other. The transactions that are in a block of a discarded blockchain may be returned to a queue and wait to be added to a next block.

In some cases, forks may result from changes related to the blockchain implementation, for example, changes to the blockchain protocols and/or software. Forks may be more disruptive for permissionless and globally distributed blockchain networks than for private blockchain networks due to their impact on a larger number of users. A change or update to the blockchain implementation that is backwards compatible may result in a soft fork. When there is a soft fork, some nodes may execute the update blockchain implementation while other nodes may not. However, nodes that do not update to the new blockchain implementation may continue to transact with updated nodes.

A change to the blockchain implementation that is not backwards compatible may result in a hard fork. While hard forks are generally intentional, they may also be caused by unintentional software bugs/errors. In such a case, all publishing nodes in the network may need to update to the new blockchain implementation. While publishing nodes that do not update to the new blockchain implementation may continue to publish blocks according to the previous blockchain implementation, these publishing nodes may reject blocks created based on the new blockchain implementation and continue to accept blocks created based on the previous blockchain implementation. Therefore, nodes on different hard fork versions of the blockchain may not be able to interact with one another. If all nodes move to the new blockchain implementation, then the previous version may be discarded or abandoned. However, it may not be practical or feasible to update all nodes in the network to a new blockchain implementation, for example, if the update invalidates specialized hardware utilized by some nodes.

Blockchain-Based Application: Cryptocurrency

Cryptocurrency is a medium of exchange that may be created and stored electronically in a blockchain, such as a the blockchain 130a in FIG. 1. Bitcoin is one example of cryptocurrency, however there are several other cryptocurrencies. Various encryption techniques may be used for creating the units of cryptocurrency and verifying transactions. As an example, the first user 110 may own 10 units of a cryptocurrency. The blockchain 130a may include a record indicating that the first user 110 owns the 10 units of cryptocurrency. The first user 110 may initiate a transfer of the 10 units of cryptocurrency to the second user 115 via a wallet application executing on the first client device 120. The wallet application may store and manage a private key of the first user 110. Examples of the wallet device include a personal computer, a laptop computer, a smartphone, a personal data assistant (PDA), etc.

Figure 6A:
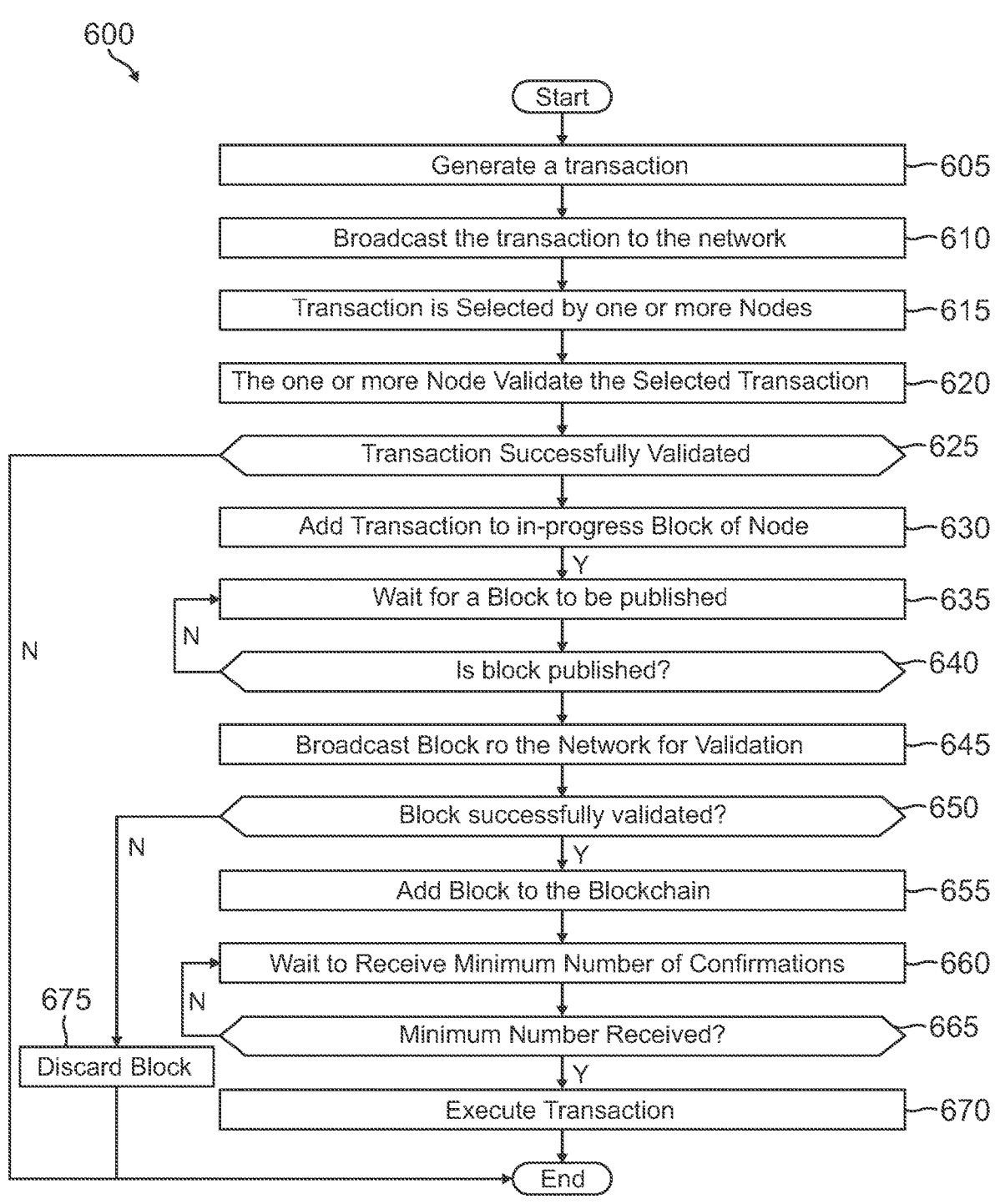
FIG. 6A illustrates a flow diagram showing steps of an example method for performing a blockchain based transaction, according to an embodiment.

FIG. 6A is a flow diagram showing steps of an example method 600 for performing a blockchain transaction between entities, such as the first user 110 of the first client device 120 and the second user 115 of the second client device 125 in FIG. 1. The steps of the method 600 may be performed by any of the computing devices shown in FIG. 1. Alternatively or additionally, some or all of the steps of the method 600 may be performed by one or more other computing devices. Steps of the method 600 may be modified, omitted, and/or performed in other orders, and/or other steps added.

At step 605, the wallet application may generate transaction data for transferring the 10 units of cryptocurrency from the first user 110 to the second user 120. The wallet application may generate a public key for the transaction using the private key of the first user 110. In order to indicate that the first user 110 is the originator of the transaction, a digital signature may also be generated for the transaction using the private key of the first user 110. As discussed with reference to FIG. 4, the transaction data may include information, such as a blockchain address of the sender 430, the digital signature 455, transaction output information 460, and the public key of the sender 415. The transaction data may be sent to the first server 150 from the first client device 125.

The first server 150 may receive the transaction data from the first client device 125. At step 610, the first server 150 may broadcast the transaction to the blockchain network 130a. The transaction may be received by one or more nodes 205 of the blockchain network 130a. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. Validating the transaction may include determining whether the transaction is legal or conforms to a pre-defined set of rules for that transaction, establishing user authenticity, and establishing transaction data integrity. At step 625, if the transaction is successfully validated by a node 205, the validated transaction is added to a block being constructed by that node 205 (step 630). As discussed above, since different nodes 205 may choose to validate different transactions, different nodes 205 may build or assemble a block comprising different validated transactions. Thus, the transaction associated with the first user 110 transferring 10 units of cryptocurrency to the second user 115 may be included in some blocks and not others.

At step 635, the blockchain network 130a may wait for a block to be published. Validated transactions may be added to the block being assembled by a node 205 until it reaches a minimum size specified by the blockchain. If the blockchain network 130a utilizes a proof of work consensus model, then the nodes 205 may compete for the right to add their respective blocks to the blockchain by solving a complex mathematical puzzle. The node 205 that solves its puzzle first wins the right to publish its block. As compensation, the winning node may be awarded a transaction fee associated with the transaction (e.g., from the wallet of the first user 110). Alternatively, or in addition, the winning node may be awarded compensation as an amount of cryptocurrency added to an account associated with the winning node from the blockchain network (e.g., "new" units of cryptocurrency entering circulation). This latter method of compensation and releasing new units of cryptocurrency into circulation is sometimes referred to as "mining." At step 640, if a block has not been published, then the process 600 returns to step 635 and waits for a block to be published. However, at step 640, if a block has been published, then the process 600 proceeds to step 645.

At step 645, the published block is broadcast to the blockchain network 130a for validation. At step 650, if the block is validated by a majority of the nodes 205, then at step 655, the validated block is added to the blockchain 220. However, at step 650, if the block is not validated by a majority of the nodes 205, then the process 600 proceeds to step 675. At step 675, the block is discarded and the transactions in the discarded block are returned back to the queue. The transactions in the queue may be selected by one or more nodes 205 for the next block. The node 205 that built the discarded block may build a new next block.

At step 660, if the transaction was added to the blockchain 220, the server 150 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and assets from the first user 110 may be transferred to the second user 115. For example, the 10 units of cryptocurrency owned by the first user 110 may be transferred from a financial account of the first user 110 to a financial account of the second user 115 after the transaction receives at least three confirmations.

Smart Contracts

A smart contract is an agreement that is stored in a blockchain and automatically executed when the agreement's predetermined terms and conditions are met. The terms and conditions of the agreement may be visible to other users of the blockchain. When the pre-defined rules are satisfied, then the relevant code is automatically executed. The agreement may be written as a script using a programming language such as Java, C++, JavaScript, VBScript, PHP, Perl, Python, Ruby, ASP, Tcl, etc. The script may be uploaded to the blockchain as a transaction on the blockchain.

As an example, the first user 110 (also referred to as tenant 110) may rent an apartment from the second user 115 (also referred to as landlord 115). A smart contract may be utilized between the tenant 110 and the landlord 115 for payment of the rent. The smart contract may indicate that the tenant 110 agrees to pay next month's rent of $1000 by the $28^{th}$ of the current month. The agreement may also indicate that if the tenant 110 pays the rent, then the landlord 115 provides the tenant 110 with an electronic receipt and a digital entry key to the apartment. The agreement may also indicate that if the tenant 110 pays the rent by the $28^{th}$ of the current month, then on the last day of the current month, both the entry key and the rent are released respectively to the tenant 110 and the landlord 115.

Figure 6B:
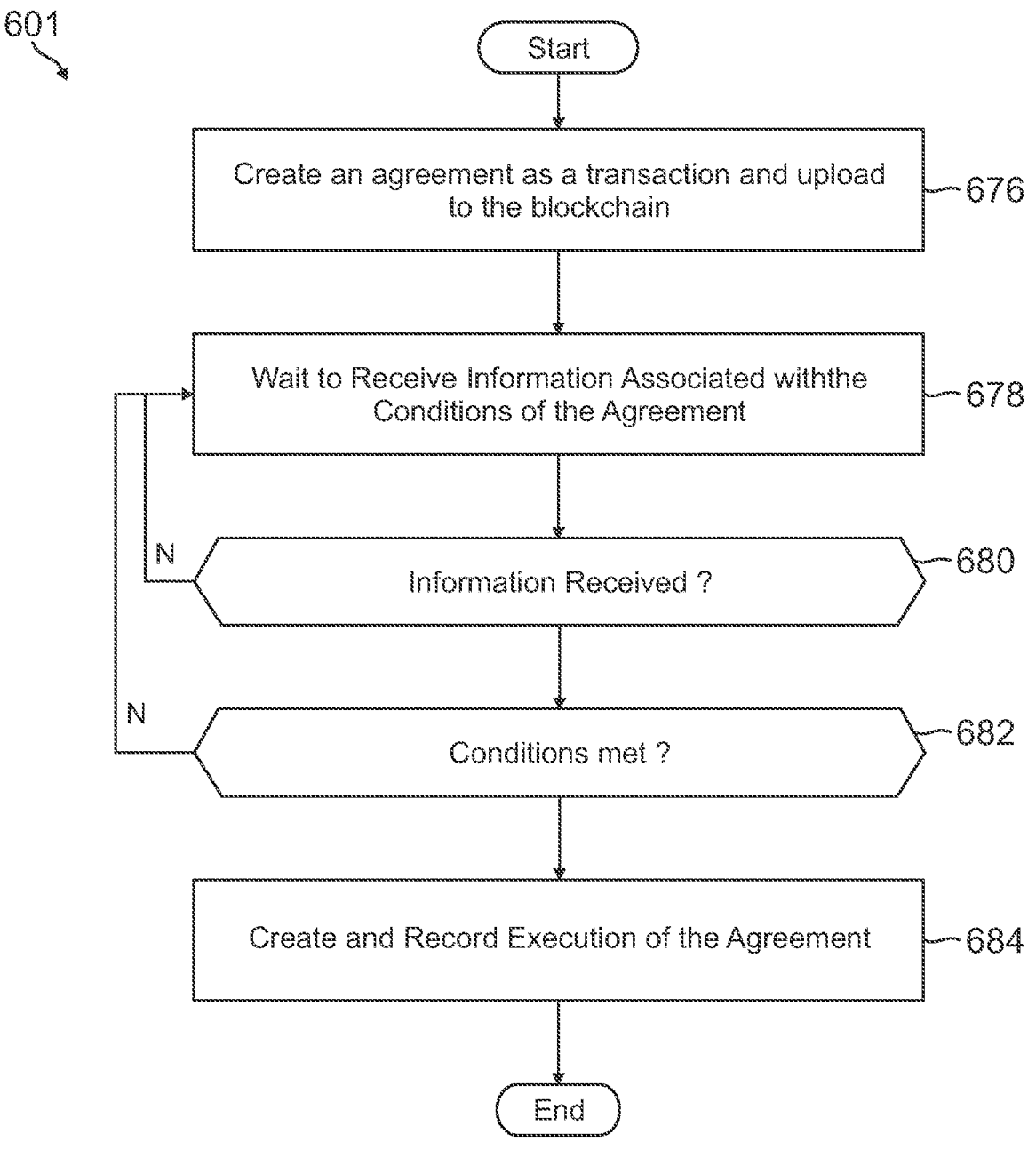
FIG. 6B illustrates a flow diagram showing steps of an example method for performing a blockchain based transaction, according to an embodiment.

FIG. 6B is a flow diagram showing steps of an example method 601 for performing a smart contract transaction between entities, such as the tenant 110 and the landlord 115. The steps of the method 601 may be performed by any of the computing devices shown in FIG. 1. Alternatively or additionally, some or all of the steps of the method 601 may be performed by one or more other computing devices. Steps of the method 601 may be modified, omitted, and/or performed in other orders, and/or other steps added.

At step 676, the agreement or smart contract between the tenant 110 and the landlord 115 may be created and then submitted to the blockchain network 130a as a transaction. The transaction may be added to a block that is mined by the nodes 205 of the blockchain network 130a, the block comprising the transaction may be validated by the blockchain network 130a and then recorded in the blockchain 220 (as shown in steps 610-655 in FIG. 6A). The agreement associated with the transaction may be given a unique address for identification.

At step 678, the process 601 waits to receive information regarding the conditions relevant for the agreement. For example, the process 601 may wait to receive notification that $1000 was sent from a blockchain address associated with the tenant 110 and was received at a blockchain address associated with the landlord 115 by the $28^{th}$ of the current month. At step 680, if such a notification is not received, then the process 601 returns to step 678. However, if at step 680, a notification is received, then the process 601 proceeds to step 682.

At step 682, based on determining that the received notification satisfies the conditions needed to trigger execution of the various terms of the smart contract, the process 601 proceeds to step 684. However, at step 682, if it is determined that the received notification does not satisfy the conditions needed to trigger execution of the smart contract, then the process 601 returns to step 678. At step 684, the process 601 creates and records a transaction associated with execution of the smart contract. For example, the transaction may include information of the payment received, the date the payment was received, an identification of the tenant 110 and an identification of the landlord 115. The transaction may be broadcast to the blockchain network 130a and recorded in the blockchain 220 (as shown in steps 610-655 of the process 600 of FIG. 6A). If the transaction is successfully recorded in the blockchain 220, the transaction may be executed. For example, if the payment was received on the $28^{th}$, then an electronic receipt may be generated and sent to the tenant 110. However, on the last day of the current month, both the digital entry key and the rent are released respectively to the tenant 110 and the landlord 115.

Smart contracts may execute based on data received from entities that are not on the blockchain or off-chain resources. For example, a smart contract may be programmed to execute if a temperature reading from a smart sensor or IoT sensor falls below 10 degrees. Smart contracts are unable to pull data from off-chain resources. Instead, such data needs to be pushed to the smart contract. Additionally, even slight variations in data may be problematic since the smart contract is replicated across multiple nodes of the network. For example, a first node may receive a temperature reading of 9.8 degrees and a second node may receive a temperature reading of 10 degrees. Since validation of a transaction is based on consensus across nodes, even small variations in the received data may result in a condition of the smart contract to be evaluated as being not satisfied. Third party services may be utilized to retrieve off-chain resource information and push this to the blockchain. These third-party services may be referred to as oracles. Oracles may be software applications, such as a big data application, or hardware, such as an IoT or smart device. For example, an oracle service may evaluate received temperature readings beforehand to determine if the readings are below 10 degrees and then push this information to the smart contract. However, utilizing oracles may introduce another possible point of failure into the overall process. Oracles may experience errors, push incorrect information or may even go out of business.

Since blockchains are immutable, amending or updating a smart contract that resides in a blockchain may be challenging and thus, more expensive and/or more restrictive than with text-based contracts.

Blockchain Enabled In-Store Purchasing

Figure 8:
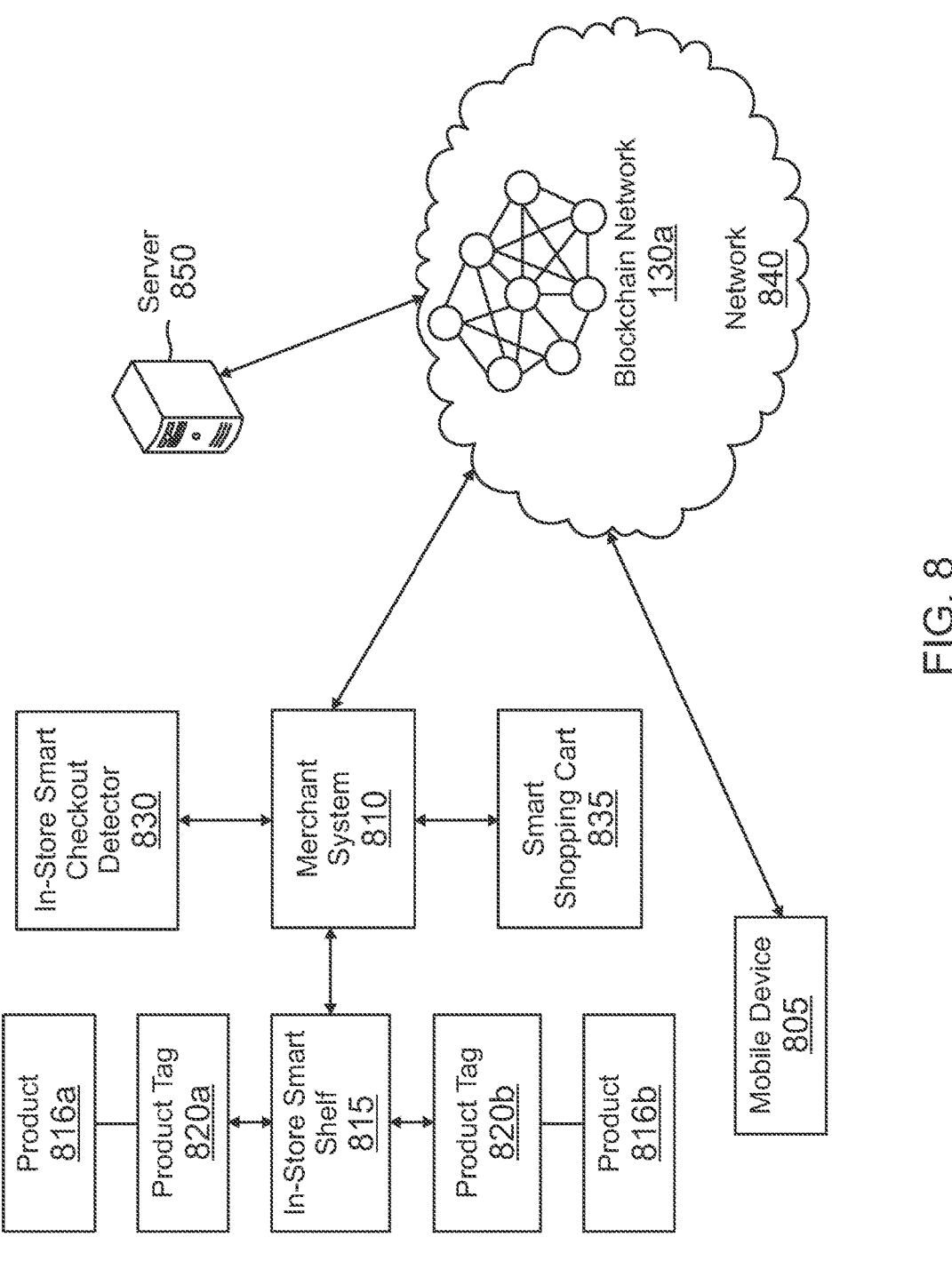
FIG. 8 illustrates a block diagram of a blockchain enabled in-store purchase system, according to an embodiment.

An example of blockchain enabled in-store purchasing is described with reference to the system 800 shown in FIG. 8, the process 600 shown in FIG. 6A and the process 601 shown in FIG. 6B. FIG. 8 illustrates an example of a blockchain enabled in-store purchase system 800. The system 800 includes a mobile device 805, a merchant system

810, and a server 850 connected via a network 840. The merchant system 810 may be connected via a local wireless network to various IoT devices within a store, for example, an in-store smart shelf 815, and an in-store smart checkout detector 830.

The store may include one or more smart shelves, such as the in-store smart shelf 815. The smart shelf 815 may include an RFID tag, an RFID reader, and an antenna. One or more products may be stored on the in-store smart shelf 815. Each product may include an RFID tag, such as a first product tag 820a attached to a first product 816a and a second product tag 820b attached to a second product 816b. The in-store smart shelf 815 may, based on reading the product tags 820a and 820b, send information about the products 816a and 816b throughout the day to the merchant system 810. The merchant system 810 may in turn update an inventory of products currently within the store.

A shopper may travel through the store with the mobile device 805. A digital shopping list on the mobile device 805 may include a list of items that the shopper may need to purchase. For example, the shopping list may include an item that matches the first product 816a. When the shopper is close to the in-store smart shelf 815, the mobile device 805 may notify the shopper that the first product 816a is currently available on the in-store smart shelf 815. The shopper may remove the first product 816a from the in-store smart shelf 815 and place it into a smart shopping cart 835. The smart shopping cart 835 may read the first product tag 820a as well as the product tags attached to other products that may have been placed in the smart shopping cart 835. When the shopper is ready to checkout, the shopper may walk out of the store with the shopping cart 835. As the shopper walks out of the store, the in-store smart checkout detector 830 may detect the smart shopping cart 835. The smart shopping cart 835 may communicate with the in-store smart checkout detector 830 and transmit information about the products in the smart shopping cart. The in-store smart checkout detector 830 may send information about the products, such as the first product 816a, and payment information from the mobile device 805 to the merchant system 810. The merchant system 810 may receive information from the in-store smart checkout detector 830 and the payment information and proceed to initiate purchase of the first product 816a.

Referring to step 605 of the process 600 shown in FIG. 6A, a wallet application on the mobile device 805 may generate transaction data for transferring an amount of cryptocurrency matching the sale price of the first product 816a from the shopper to the merchant. The wallet application may generate a public key for the transaction using the private key of the shopper. In order to indicate that the shopper is the originator of the transaction, a digital signature may also be generated for the transaction using the private key of the shopper. The transaction data may be sent to the server 850 from the mobile device 805.

The server 850 may receive the transaction data from the mobile device 805. At step 610, the server 850 may broadcast the transaction to the blockchain network 130a. The transaction may be received by one or more nodes 205 of the blockchain network 130a. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. At step 625, if the transaction is successfully validated by a node 205, the validated transaction is added, at step 630, to a block being constructed by that node 205. At step 635, the blockchain network 130a may wait for a block to be published. At step 640, if a block has not been published, then the process 600 returns to step 635 and waits for a block to be published. However, at step 640, if a block has been published, then the process 600 proceeds to step 645.

At step 645, the published block is broadcast to the blockchain network 130a for validation. At step 650, if the block is validated by a majority of the nodes 205, then at step 655, the validated block is added to the blockchain 220. At step 660, if the transaction was added to the blockchain 220, the server 850 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and the sale price of the first product 816a may be transferred from the shopper to the merchant.

When the in-store smart checkout detector 830 sends information about the products, such as the first product 816a, and payment information from the mobile device 805 to the merchant system 810, a smart contract may be created between the shopper and the merchant and executed according to the process 601 shown in FIG. 6B. For example, at step 676, a smart contract between the shopper and the merchant may be created and then submitted to the blockchain network 130a as a transaction. For example, at step 678, the process 601 may wait to receive notification that an amount of cryptocurrency equal to the sale price of the first product 816a was sent from a blockchain address associated with the shopper and was received at a blockchain address associated with the merchant by the time the first product 816a is removed from the smart shopping cart 835. If the payment for the first product 816a was successfully transferred from the shopper to the merchant by the time the shopper removes the first product 816a from the smart shopping cart 835, then an electronic receipt may be generated and sent to the shopper. Otherwise, the merchant system 815 may be alerted that the shopper is attempting to leave the premises without paying for the first product 816a.

Blockchain Enabled In-Vehicle Purchasing

Figure 9:
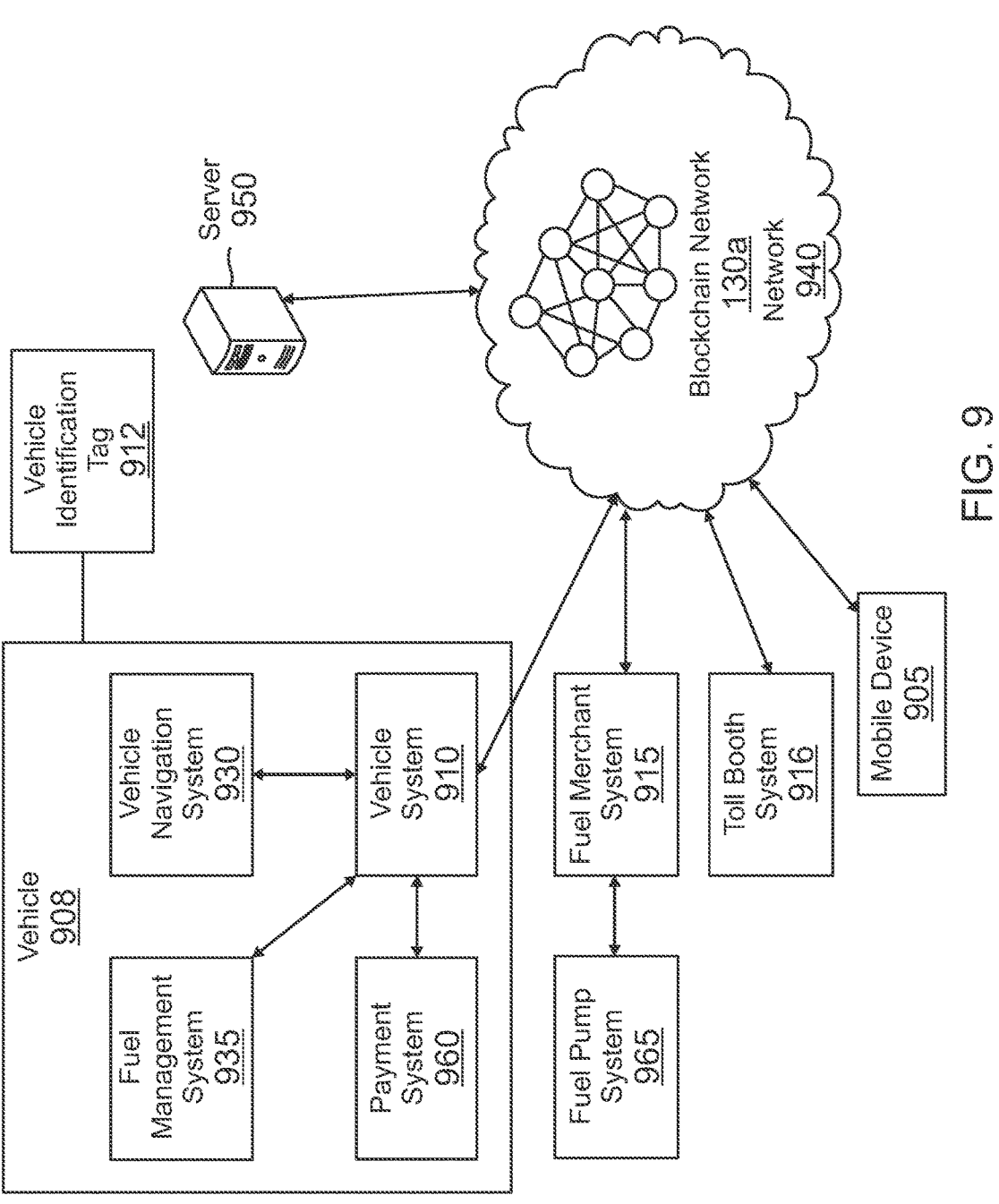
FIG. 9 illustrates a block diagram of a blockchain enabled in-vehicle purchase system, according to an embodiment.

An example of blockchain enabled in-vehicle purchasing is described with reference to the system 900 shown in FIG. 9, the process 600 shown in FIG. 6A and the process 601 shown in FIG. 6B. FIG. 9 illustrates an example system 900 for blockchain enabled in-vehicle purchasing. The system 900 includes an IoT enable smart vehicle 908. The vehicle 908 may include one or more computing devices implementing a vehicle system 910, a vehicle navigation system 930, a payment system 960 and a fuel management system 935. The vehicle 908 may include a RFID tag, such as a vehicle identification tag 912. The system 900 may also include various merchant systems, such as a fuel merchant system 915, and a toll booth system 916. The system 900 may also include a mobile device 905 belonging to a driver of the vehicle 908.

When the driver gets into the vehicle 908, payment information may be loaded from the driver's mobile device 905 into the vehicle payment system 910 so it is available for secure payments to other devices in order to complete in-vehicle purchases, such as in-vehicle purchase of fuel and in-vehicle payment of tolls. The driver of the smart vehicle may pay for parking, fast food, using the IoT enabled smart vehicle 908. Additionally, the IoT enabled smart vehicle 908 may also facilitate in-vehicle purchasing of smartphone apps, music, audio books, and other goods and services.

The fuel management system 935 may perform various functions related to fuel usage and communicate with the vehicle system 916. For example, the fuel management system 935 may monitor fuel usage and based on detecting that the fuel is below a threshold, notify the vehicle system 910. The vehicle system 910 may communicate with the vehicle navigation system 930 to determine nearby fuel stations. The selection of a fuel station to may be based on various factors, such as the availability of fuel at nearby fuel stations, the vehicle's current route and location, incentives that may be offered by nearby fuel stations, etc. The vehicle system 910 may notify the driver about the selection of a fuel station and the vehicle 908 may be re-routed to the selected fuel station. Upon arriving at the selected fuel station, the driver may pull up to a fuel pump. The fuel pump may include a fuel pump system 965 configured to detect the RFID tags of vehicles, such as the vehicle identification tag 912 in order to obtain an identification of the vehicles. The fuel pump system 965 and the payment system 960 may be configured to communicate with each other. The fuel payment system 960 may send payment information to the fuel pump system 965. After the driver has completed re-fueling, the driver may simply drive away. The fuel pump system 965 may send the fuel merchant system 915 information about the identification of the vehicle 908, the amount of fuel purchased, and the payment information. The fuel merchant system 915 may use the information to complete a transaction with the driver for the purchase of the fuel. For example, the fuel merchant system 915 may communicate with the server 950 to charge the driver for the fuel according to the process 600 shown in FIG. 6A. Additionally, the fuel merchant system 915 may communicate with the server 950 in order to create a smart contract between the driver and the fuel merchant. The smart contract may be created and executed according to the process 601 shown in FIG. 6B.

Augmented Reality (AR), Mixed Reality and Blockchain Based E-Commerce

AR or mixed reality enabled devices, such as wearable smart glasses, head mounted devices, holographic devices, or smartphone applications overlay digital content on top of a real world view, thus, enhancing a user's experience of the real world. The overlay content may be 3D models generated based on 3D scanning real world objects. AR enables users to experience online shopping in a virtual environment. For example, using AR, browse virtual stores and view 3D models of items for sale in virtual stores. Just as in the real world, customers may be able to handle and examine various physical details of the products. Blockchain smart contracts may be utilized to provide an e-commerce platform where customers may purchase items from online merchants with cryptocurrency and digital wallets. Information about a product, such as country of origin, materials, ingredients, price, description, measurements, terms and conditions, 3D model of the physical product, etc., may be hashed and recorded in a blockchain. This provides proof of ownership of virtual goods and products and enables accurate tracking of any changes made to this information. Artificial intelligence (AI) may be utilized for generating 3D models of products based on 2D images of the products. Smart contracts may be utilized to conduct transactions between merchants and customers.

As an example, a customer may shop for clothing by browsing different stores in a virtual shopping mall via a wearable AR device, such as a pair of smart glasses. The customer may examine a 3D model of a shirt as he or she would in the real world. Additionally, the customer may virtually try on the shirt using a 3D model of the customer's body. If the customer decides to purchase the shirt, the customer may initiate a transaction with the merchant of the store. A transaction may be submitted to the blockchain via the customer's digital wallet to transfer money (cryptocurrency) from the customer to the merchant. Various smart contracts may be utilized to implement various aspects of the e-commerce process. For example, based on detecting that the sale price of the shirt has been successfully transferred from the customer to the merchant, a smart contract may be executed to initiate shipment of the shirt from the merchant's warehouse to the customer. As described above with reference to supply chain monitoring and tracking, RFID tags and other IoT devices may be utilized to track the shipment of the shirt from the merchant's warehouse to the delivery of the shirt to the customer's residence.

Quantum Computing

One of the concerns of quantum computing is that it may increase the probability of breaking cryptographic algorithms and thus, weaken overall security for the blockchain. This may be addressed by requiring larger key sizes for blockchain asymmetric-key pairs of cryptographic algorithms. In some cases, if there is a concern that a block may be decrypted in the future, a dynamically changing cryptographic hash may be utilized. A different cryptographic hash may be dynamically selected for a particular block or the entire blockchain based on various factors, such as whether there is a concern that the block will be decrypted in the future, increasing a strength of the hash, utilizing a hash that is better suited for protecting privacy. In some cases, different cryptographic hashes may be selected for different blocks.

Anonymity and Privacy

As discussed above, the use of a private/public key pair to establish user authenticity during validation of a blockchain transaction provides some privacy as it does not reveal user identity. However, the transactions stored on a blockchain may be visible to the public. It has been shown that user identity may be derived from the publicly available transaction information.

Blockchain Size

Depending on a frequency at which events are recorded in a blockchain, the size of the blockchain may grow quickly. Computing/storage capacity (i.e., faster processors, larger storage components) may be needed to support the expansion of the blockchain. In some cases, blocks may be compressed prior to being added to the chain. In some cases, blocks may be eliminated, for example, at the beginning of the blockchain, when they become stale or irrelevant. As an example, a method for "replacing" the first 1000 transactions with a new block that effectively mimics the hash of the 1000 transactions may be useful for managing blockchain size.

Blockchain Immutability

In some cases, content in a blockchain may need to be deleted. For example, content may need to be deleted if there is a security breach or if the content is no longer relevant. A level of immutability of a blockchain may depend on a type of the blockchain. For example, changing content may be difficult in a public blockchain due to its possible impact on a large number of users. According to some techniques, data stored in a private blockchain, or a public blockchain controlled by a few entities may be changed by recording a flag (current block) where the change is being made, and adding the current block (referred to by the flag) to the blockchain. The added block may then indicate the change made to the previous block.

As another example, a blockchain may need to be changed to resolve a broken link. For example, the hash of a changed block may no longer match the hash stored in the block+1. In some cases, the blockchain may need to be changed in order to reverse the results of illegal transactions. In some cases, the blockchain may need to be changed to address software errors, erroneous transactions, or remove information that is confidential or required by law to be removed. If the blockchain is immutable, these errors and information may be permanently embedded in the block-chain. Additionally, the blockchain may need to be changed to comply with regulatory concerns, such as the European Union's incoming General Data Protection Regulation (GDPR), or California Consumer Privacy Act (CCPA), regarding consumer data privacy and ownership rights, US Fair Credit Reporting Act, and the SEC's "Regulation SP," which require that recorded user identifiable personal finan-cial data be redactable.

Some techniques may allow modifications to the block-chain to address software errors, legal and regulatory requirements, etc., by allowing designated authorities to edit, rewrite or remove previous blocks of information without breaking the blockchain. Such techniques may enable blockchain editing by using a variation of a "chame-leon" hash function, through the use of secure private keys. This editing may allow smart contracts that were flawed at issue to be updated so that the changes carry over to subsequent smart contracts in the blockchain. Using these techniques, blocks that have been changed may be using a "scar" or mark that cannot be removed, even by trusted parties.

According to some techniques, when a block is hashed, any confidential information, such as personally identifiable information, and IP addresses, is not included in the hash because it is not part of the data values that were hashed. But because there is no hash of the confidential information, it may be changed. According to some techniques, the confi-dential information may not be placed or recorded into the blockchain. Rather the information may reside in a file that is external to the blockchain. A hash of that file, however, may be recorded in the blockchain. For example, a user's confidential information may be deleted locally without affecting the blockchain.

As another example, assuming that all content included in a block in a blockchain cannot be changed after a block is added to the blockchain, a determination may be made before adding data to the blockchain of whether some or all of that data may need to be deleted at a later time. For example, confidential information (i.e., data to be deleted at a later time) may be stored as a file that is external to the block and the blockchain. For the purposes of creating the block, a link to the file containing the confidential informa-tion and a hash of the file containing the confidential information file may be added to the block. An example of a link would be an HTTP link. During confirmation of the block that is to be added to the blockchain, the network nodes may be able to access the confidential information and verify that the confidential information based on the hash value of the file in the block. Because the hash value of the file is a part of the block, the file containing the confidential information may not be easily changed. However, it may be possible to change the confidential information file by changing the data therein and adding a nonce. This may seek to change the nonce until the resulting hash equals the hash that is stored in the blockchain. However, this would be difficult (probably near impossible), and an inspection of the modified confidential information file would reveal the added nonce, which may then raise suspicion that informa-tion was changed since it was first added to the blockchain.

Files containing confidential information may be encrypted (e.g., through an asymmetric key encryption func-tion) prior to the hashing operation. When "deleting" the confidential information, the file containing the confidential information may be deleted or removed resulting in the link, which is stored in the blockchain, being ineffective for retrieving the file. The hash of the file, and the link, remain in the blockchain so that the linking of the blocks through hash functions is not affected. However, because of this change, a transaction that is part of the block or part of a different special block could be added to the blockchain to indicate that the link is no longer effective and the confi-dential information file is no longer part of the blockchain. This may effectively keep confidential information out of the blockchain while providing the confidential information to users of the blockchain and proof of authenticity of the confidential information before it is deleted from the block-chain. This may come with drawbacks because access to data implies that such data may be stored. Accordingly, those with access to the confidential information file, while it was part of the blockchain, may have stored that information in another location that may no longer be reachable during the "deleting" operation discussed above.

51% Attack

A "51% attack" refers to an individual mining node or a group of mining nodes controlling more than 50% of a blockchain network's mining power, also known as hash rate or hash power. The hash rate is a measure of the rate at which hashes are being computed on the blockchain net-work. As described above, hashing may include taking an input string of a given length, and running it through a cryptographic hash function in order to produce an output of a fixed length. A blockchain network's hash rate may be expressed in terms of 1 KH/s (kilohash per second) which is L000 hashes per second. 1 MH/s (megahash per second) which is 1,000,000 hashes per second, 1 TH/s (terahash per second) which is 1,000,000,000,000 hashes per second, or 1 PH/s (petahash per second) which is L000,000,000,000,000 hashes per second. As an example, a mining node in a blockchain utilizing a proof of work consensus model (PoW) may perform hashing in order to find a solution to a difficult mathematical problem. The hash rate of the mining node may depend on the computational resources available to that node. A mining node that successfully solves the mathematical problem may be able to add a block to the blockchain. Thus, by ensuring that invalid transactions can-not be included in a block, mining nodes increase the reliability of the network. Transactions may be deemed invalid if they attempt to spend more money than is currently owned or engage in double spending. If a mining node intentionally or unintentionally includes an invalid transac-tion in a block, then the block will not be validated by the network. Additionally, nodes that accept the invalid block as valid and proceed to add blocks on top of the invalid block will also end up wasting computational resources. Thus, mining nodes are discouraged from cheating by intentionally adding invalid transactions to blocks and accepting invalid blocks as valid.

Figure 7A:
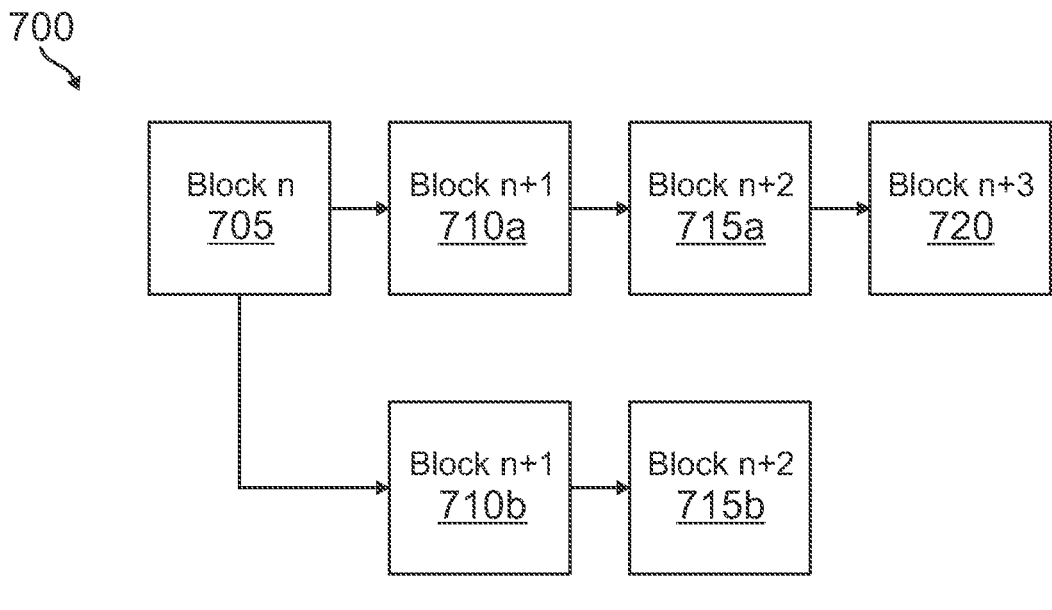
FIG. 7A illustrates an example of a privately broadcasted blockchain, according to an embodiment

An entity may be able to disrupt the network by gaining control of 50% of a network's hash rate. In a 51% attack, a blockchain node may intentionally reverse or overwrite transactions and engage in double spending. When a node generates a valid block of transactions, it broadcasts the block to the network for validation. In some cases, a node controlling more than 50% of a network's hash rate may mine blocks in private without broadcasting them to the network. In such a scenario, the rest of the network may follow a public version of the blockchain while the controlling node may be following its private version of the blockchain. FIG. 7A shows a fraudulent and valid version of a blockchain 700. The valid blockchain on the top comprises the valid blocks 705, 710*a*, 715*a*, and 720. The fraudulent blockchain on the bottom is not broadcast to the network and includes the blocks 705, 710*b*, 715*b*, and an invalid block 720.

Figure 7B:
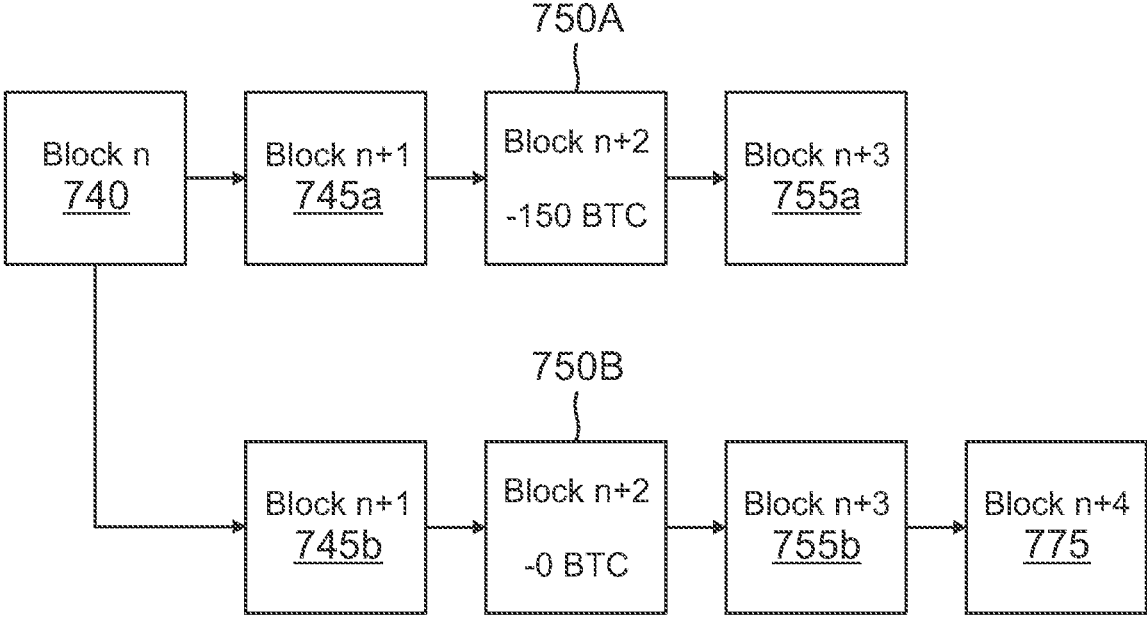
FIG. 7B illustrates an example of blockchain misuse, according to an embodiment.

FIG. 7B shows another fraudulent and valid version of a blockchain. The valid version of the blockchain includes nodes 740, 745*a*, 750*a*, and 755*a*. The fraudulent version of the blockchain includes nodes 740, 745*b*, 750*b*, 755*b*, and 775. However, following the longest chain rule, the network may select and utilize the private or fraudulent blockchain comprising nodes 740, 745*b*, 750*b*, 755*b* and 775. Since it is the longest chain, previous transactions may be updated according to this chain. The cheating node may include transactions that spend money, such as the block 750*b* including the transaction for 150 BTC, on the public or fraudulent version of the blockchain without including these transactions in the private version of the blockchain. Thus, in the private version of the blockchain, the cheating node may continue to own the spent 150 BTC. When the cheating node controls more than 50% of the hashing resources of the network, it may be able to broadcast its private version of the blockchain and continue to create blocks on the private blockchain faster than the rest of the network, thus, resulting in a longer blockchain. Since there are two versions of the blockchain, the network may select the longest or fraudulent private blockchain as the valid blockchain. As a result, the rest of the network may be forced to use the longer blockchain. The public or valid version of the blockchain may then be discarded or abandoned and all transactions in this blockchain that are not also in the private or fraudulent version of the blockchain may be reversed. The controlling or cheating node may continue to own the spent money because the spending transactions are not included on the fraudulent version of the blockchain, and the cheating node may therefore, spend that money in future transactions.

Because of the financial resources needed to obtain more hashing power than the rest of the entire network combined, a successful 51% attack may generally be challenging to achieve. However, it would be less expensive to achieve a 51% attack on a network with a lower hash rate than one with a higher hash rate. Additionally, the probability of a successful 51% attack increases with the use of mining pools in which multiple nodes may combine their computational resources, for example, when mining is performed from the same mining pool.

Description of Exemplary Embodiments

Figure 10:
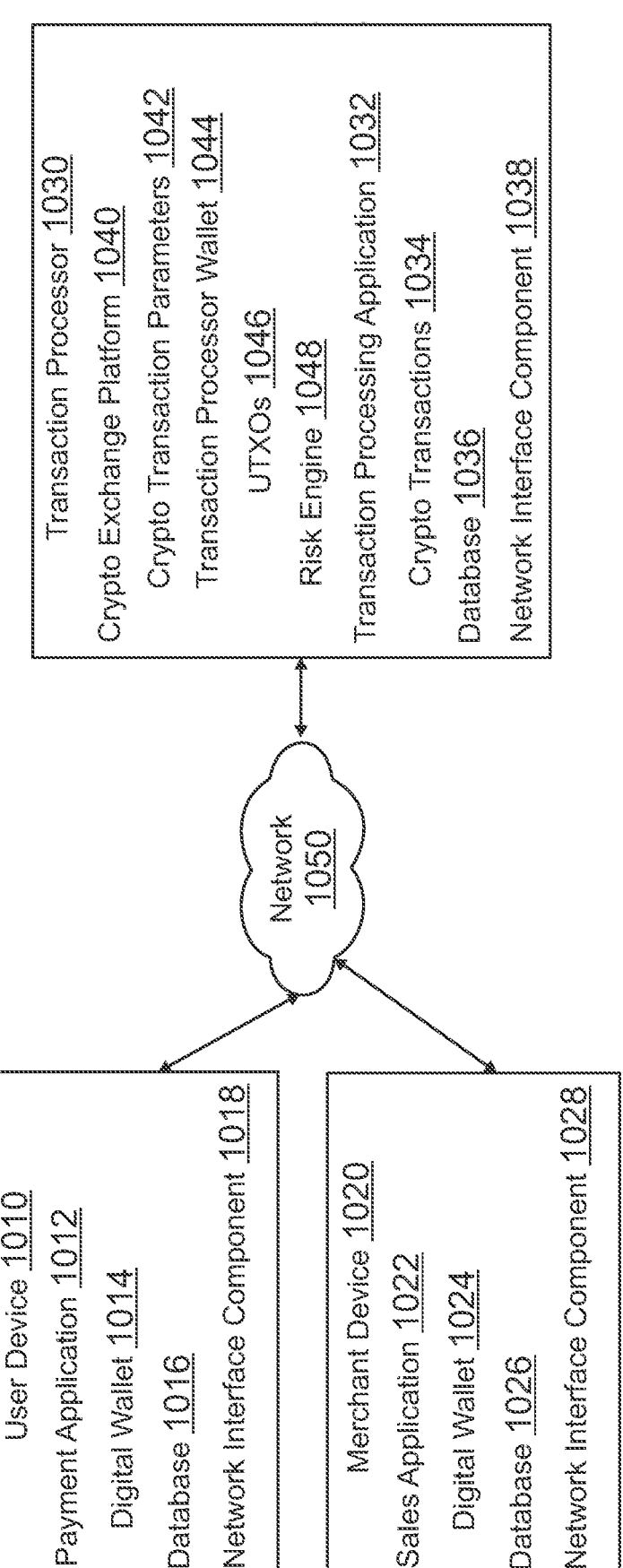
FIG. 10 illustrates a block diagram of a networked system suitable for implementing the processes described herein, according to an embodiment.

FIG. 10 is a block diagram of a networked system 1000 suitable for implementing the processes described herein, according to an embodiment. As shown, system 1000 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 10 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 1000 includes a user device 1010, a merchant device 1020, and a transaction processor 1030 in communication over a network 1050. User device 1010 may be used to process payments, such as through a payment platform, application, and/or application extension, which may be facilitated through digital accounts and wallets that allow for use of cryptocurrency to process transactions using transaction processor 1030. During cryptocurrency transaction processing, merchant device 1020 may engage in transaction processing, which may not have a corresponding node on a layer two network for a cryptocurrency that is utilized by user device 1010 for cryptocurrency transaction processing. Transaction processor 1030 may facilitate transaction processing by providing access to user device 1010 on a layer one network for the cryptocurrency for an amount for the transaction, where the amount is transferred back to transaction processor 1030 from user device 1010 on the layer two network.

User device 1010, merchant device 1020, and transaction processor 1030 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 1000, and/or accessible over network 1050.

User device 1010 may be implemented using any appropriate hardware and software configured for wired and/or wireless communication with merchant device 1020 and/or transaction processor 1030 for processing payments and transactions including use, conversion, and/or exchange of cryptocurrency to engage in electronic transaction processing on different network layers for cryptocurrencies. User device 1010 may correspond to an individual user, consumer, or merchant that utilizes a payment network and platform provided by transaction processor 1030 to process those transactions. In various embodiments, user device 1010 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing devices may function similarly.

User device 1010 of FIG. 10 contains a payment application 1012, a database 1016, and a network interface component 1018. Payment application 1012 may correspond to executable processes, procedures, and/or applications with associated hardware. In other embodiments, user device 1010 may include additional or different software as required.

Payment application 1012 may correspond to one or more processes to execute modules and associated devices of user device 1010 to provide a convenient interface to permit a user of user device 1010 to enter, view, and/or process transactions, such as by using a digital wallet 1014 having available cryptocurrency. In this regard, payment application 1012 may correspond to specialized hardware and/or software utilized by user device 1010 that may provide transaction processing using an amount of funds in a cryptocurrency, where that amount of funds may be available to digital wallet 1014 via a particular network layer of a cryptocurrency, such as through a layer two network that resides on top of a layer one network and processes transactions faster and/or more efficiently while later finalizing the transaction recordation on the layer one network. In some embodiments, the transaction may be to request a payment to another user in a cryptocurrency, such as a seller or merchant associated with merchant device 120. Exchange, conversion, and/or sale of cryptocurrency and electronic transaction processing in a cryptocurrency may be done through a user interface enabling the user to enter and/or view an amount of funds to be paid in a cryptocurrency (e.g., request a payment to the merchant), the requested cryptocurrency and/or network layer for the payment, other conditions for processing cryptocurrency transaction, and the like. This may be based on a transaction generated by payment application 1012 using a merchant website and/or when engaging in transaction processing at a physical merchant location. For example, a transaction may be generated, initiated, and/or detected by transaction processor 1030, or electronic transaction processing may be requested when user device 1010 and merchant device 1020 interact to perform electronic transaction processing. Payment application 1012 may also be used to receive a receipt or other information based on transaction processing.

In this regard, payment application 1012 may be used to receive an offer and/or extension of an access to the amount of cryptocurrency available from a digital wallet of transaction processor 1030. The offer may be in response to determining that merchant device 1020 and/or a corresponding merchant does not transact on the network layer for the cryptocurrency selected by the user, such as the layer two network for Bitcoin or the like. Transaction processor 1030 may then run an analysis to determine whether to offer and/or provide access to the cryptocurrency on another network and/or layer, such as the layer one network for Bitcoin, to the user associated with user device 1010, which allows the user to then transact with the merchant. Thereafter, a notification may be provided to the user via payment application 1012, which may include a link, selectable button or icon, executable operation, and/or user interface element that allows for the user to accept the extension, initiate transaction processing using the available cryptocurrency from the digital wallet of transaction processor 1030, and/or provide a transfer of a corresponding amount of cryptocurrency back to the digital wallet of transaction processor 1030 via the other network and/or layer for transaction processing. Digital wallet 1014 may be used to provide the amount of cryptocurrency and/or provide access to the cryptocurrency to the user and for use in the transaction with merchant device 1020. In various embodiments, payment application 1012 may correspond to a general browser application configured to retrieve, present, and communicate information over the Internet (e.g., utilize resources on the World Wide Web) or a private network. For example, payment application 1012 may provide a web browser, which may send and receive information over network 1050, including retrieving website information, presenting the website information to the user, and/or communicating information to the website, including payment information for the transaction. However, in other embodiments, payment application 1012 may include a dedicated application of transaction processor 1030 or other entity (e.g., a merchant), which may be configured to assist in processing transactions, such as a mobile application on a mobile device.

User device 1010 may further include database 1016 which may include, for example, identifiers such as operating system registry entries, cookies associated with payment application 1012 and/or other applications, identifiers associated with hardware of user device 1010, or other appropriate identifiers. Identifiers in database 1016 may be used by a payment/service provider to associate user device 1010 with a particular account maintained by the payment/service provider. Database 1016 may also further store received transaction data and/or data for transactions using cryptocurrency extended to a user, including private keys, offers and/or extensions of access to the cryptocurrency, and repayment terms of the accessed amount.

User device 1010 includes at least one network interface component 1018 adapted to communicate with merchant device 1020, transaction processor 1030, and/or other devices or servers over network 1050. In various embodiments, network interface component 1018 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Merchant device 1020 may be maintained, for example, by a merchant or other entity that provides items for sale to users. Merchant device 1020 may correspond to one or more physical and/or online merchant marketplaces, sales platforms, point-of-sale (POS) devices, websites, and/or online resources where a user may visit in order to shop for items. For example, merchant device 1020 may correspond to one or more POS devices at physical merchant locations to process transactions, as well as websites and/or applications accessible digital platforms, where a user may offer or be offered products, services, and other items for sale and users may browse items, select items for purchase, and engage in electronic transaction processing. Merchant device 1020 may further include other platforms, websites, and resources that may allow users to engage in electronic transaction processing, such as those associated with payment processors, transfers of funds, payment of utilities or living expenses, and other payments or purchases that may be used by users and may require payment of a balance due for some product, service, or other item. In some embodiments, merchant device 1020 may be implemented as a single or networked personal computers (PCs), servers, a smart phone, laptop computer, wearable computing device, and/or other types of computing devices. Although only one merchant device is shown, a plurality of merchant devices may function similarly.

Merchant device 1020 of FIG. 10 contains a sales application 1022, a database 1026, and a network interface component 1028. Sales application 1022 may correspond to executable processes, procedures, and/or applications with associated hardware. In other embodiments, merchant device 1020 may include additional or different software as required.

Sales application 1022 may provide and/or process items for sale with user device 1010 and/or a user associated with user device 1010 (e.g., using cryptocurrency, as well as other payment sources including a payment card, cash, etc.). In certain embodiments, sales application 1022 may be accessible over the Internet and provide for sales with user device 1010 over network 1050. Sales application 1022 may also correspond to a checkout application at a physical merchant location, such as the application(s) of a point-of-sale (POS) device used to provide sales at physical locations. Sales application 1022 may be used to establish a transaction once a user/employee associated with merchant device 1020 has selected one or more items for purchase and/or entered the item(s) to the transaction for processing. Once a payment amount is determined for the item(s) to be purchased by the user, merchant device 1020 may request payment for the transaction. Payment may be provided using cryptocurrency, however, merchant device 1020 and/or the merchant corresponding to merchant device 1020 may not have a corresponding node, digital wallet, or the like to transact with user device 1010, such as a node on the layer two network for Bitcoin or other cryptocurrency. In this regard, payment may be received from cryptocurrency on another network layer, such as the layer one network for Bitcoin or other cryptocurrency, from user device 1010 or transaction processor 1030 based on cryptocurrency that the user has access to from transaction processor 1030. After receipt of payment, cryptocurrency and/or confirmation of the cryptocurrency transfer, merchant device 1020 may then process a payment to the merchant associated with merchant device 1020 using the cryptocurrency.

Merchant device 1020 may further include database 1026 which may include, for example, identifiers associated with sales application 1022 and/or other applications, identifiers associated with hardware of merchant device 1020, or other appropriate identifiers. Database 1026 may receive and store data from user device 1010, such as in response to receiving transaction data and/or payment data. Database 1026 may therefore further store, use, and/or access cryptocurrency and/or cryptocurrency exchanges, such as those that may include payments to digital wallet 1024 in a cryptocurrency that was made available to user device 1010 on a layer one network for the cryptocurrency by transaction processor 1030.

Merchant device 1020 includes at least one network interface component 1028 adapted to communicate with user device 1010, transaction processor 1030, and/or other devices or servers over network 1050. In various embodiments, network interface component 1028 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor 1030 may be maintained, for example, by an online service provider, which may provide operations for processing cryptocurrency transactions, as well as providing access to different cryptocurrency amounts, UTXOs, and the like to users for transaction processing. In such embodiments, transaction processor 1030 may interface with the layer one and layer two networks for cryptocurrency blockchains and/or cryptocurrency exchange platforms in order to enable the processing of transactions using cryptocurrencies. Transaction processor 1030 includes one or more processing applications which may be configured to interact with user device 1010 and/or merchant device 1020 for cryptocurrency transactions and payments. In one example, transaction processor 1030 may be provided by PAYPAL®, Inc. of San Jose, Calif., USA. However, in other embodiments, transaction processor 1030 may be maintained by or include another type of service provider.

Transaction processor 1030 of FIG. 10 includes a crypto exchange platform 1040, a transaction processing application 1032, a database 1036, and a network interface component 1038. Crypto exchange platform 1040 and/or transaction processing application 1032 may correspond to executable processes, procedures, and/or applications with associated hardware. In other embodiments, transaction processor 1030 may include additional or different modules having specialized hardware and/or software as required.

Crypto exchange platform 1040 may correspond to one or more processes to execute software using associated hardware components of transaction processor 1030 to offer cryptocurrency on different networks and/or layers for cryptocurrency processing during electronic transaction processing at a physical merchant location and/or with a digital merchant (e.g., via a merchant website or application). In some embodiments, crypto exchange platform 1040 may correspond to a cryptocurrency exchange, sale, and/or purchase platform where users may utilize cold (e.g., offline) and/or hot (e.g., online) digital wallets to engage in cryptocurrency exchanges with other users, as well as perform electronic transaction processing using cryptocurrency. Crypto exchange platform 1040 may receive a transaction request for an amount of cryptocurrency that is to be processed using one of a layer one network or a layer two network for the cryptocurrency. Where one of the transaction participants does not have a corresponding digital wallet, processing node, or the like on the requested network or layer, crypto exchange platform 1040 may then facilitate obtaining an amount of funds via the other network or layer using an amount of the selected cryptocurrency from a transaction processor wallet 1044 and/or cryptocurrency exchange platform.

For example, transaction processor 1030, as well as user device 1010 and/or merchant device 1020 may correspond to or be associated with blockchains and/or cryptocurrency payment networks, which may be used to establish and process cryptocurrency transactions for different cryptocurrencies. For example, distributed transaction and/or network participants for cryptocurrencies may correspond to networks of devices that may communicate to share, update, and maintain a distributed ledger for a blockchain and cryptocurrency. In this regard, the distributed network participants may include transaction participants and miners, where transaction participants may process transactions and record those transactions and exchanges of cryptocurrencies and/or virtual currencies using a blockchain. A record may be required to be generated, updated, and maintained on a blockchain, which requires a level one network and/or level two network and allows miners to validate and broadcast the transactions and records over the distributed ledger for the blockchain. The level one network may correspond to a base network where transactions are persisted in block records when processed, such as a Bitcoin network and protocol. Further, transaction processor 1030, as well as user device 1010 and/or merchant device 1020, may utilize a layer two network, such as a Lightning network, that may reside on top of processing for the layer one network for the allow for additional data broadcasting, recording, monitoring, and/or processing. The layer two network may not require all of the prerequisites for blockchain recordation of the layer one network at the time of cryptocurrency transaction processing, as well as may batch multiple cryptocurrency microtransactions and the like, which may provide faster and/or more efficient cryptocurrency transaction processing.

Crypto exchange platform 1040 may therefore receive crypto transaction parameters 1042, which may be for a transaction between user device 1010 and merchant device 1020. Crypto transaction parameters 1042 may include transaction parameters, such as location, items, price, tax, tip, merchant and/or user location or IP address, and the like. Further, crypto transaction parameters 1042 may designate an amount to be paid (e.g., a transaction total) in a cryptocurrency and on a specified network or layer for cryptocurrency transaction processing and/or blockchain recordation. In some embodiments, crypto transaction parameters 1042 may not designate the cryptocurrency and/or processing channel, and instead may provide available cryptocurrency for specific users involved in the transaction. This may include cryptocurrency assets for each user, which may correspond to cryptocurrency available in a cold digital wallet, online account or digital wallet for a user, and/or with a cryptocurrency exchange platform. The cryptocurrency for a user may correspond to those assets owned or controlled by the user.

Crypto exchange platform 1040 may determine that one of more of user device 1010 and/or merchant device 1020 are unable to transact via the corresponding processing channel, layer, or network based on crypto transaction parameters 1042. For example, crypto exchange platform 1040 may request that the payment be made to the merchant associated with merchant device 1020 using Bitcoin via the Lightning network, which corresponds to a layer two network. However, crypto exchange platform 1040 may determine that merchant device 1020 and/or the corresponding merchant does not have a node, digital wallet, cryptocurrency processing availability, or the like on the layer two network. However, the merchant and/or merchant device 1020 may accept payment via Bitcoin (or other cryptocurrency utilizing multi-layered processing networks) and may therefore identify a layer one network digital wallet for the merchant. Thus, crypto exchange platform 1040 may determine that user device 1010 requires a corresponding amount of cryptocurrency on the layer one network to transact with merchant device 1020. For example, it may be determined that the user needs to convert off-chain balances and/or available cryptocurrency to on-chain balances and/or cryptocurrency and avoid waiting an amount of time that would be normally required for such a cryptocurrency conversion.

Crypto exchange platform 1040 may then provide access to the amount of the cryptocurrency to user device 1010 via transaction processor wallet 1044. Crypto exchange platform 1040 may provide access via available cryptocurrency and/or UTXOs 1044 resulting from cryptocurrency transactions (e.g., when there are transaction outputs from processing a cryptocurrency transaction that are unspent or unused). Prior to providing access to the user, user device 1010, and/or digital wallet 1014, crypto exchange platform 1040 may utilize a risk engine 1048 to run a risk assessment on the user, the merchant, user device 1010, merchant device 1020, the transaction, and/or other data from crypto transaction parameters 1042 to determine whether there is risk of fraud or nonpayment by the user for the amount of cryptocurrency exposed to the user for the transaction. Risk engine 1048 may run a risk analysis for a user using a rule-based and/or ML model-based engine and system that may score user activities, crypto transaction parameters 1042, and/or other data and compare that score to a threshold.

If approved, crypto exchange platform 1040 may expose the amount of cryptocurrency and/or UTXOs 1046 to the user by making access available to the user from transaction processor wallet 1044. This may include exposing or providing private keys to enable transactions between the user and the merchant. Further, crypto exchange platform 1040 may require a refund, transfer, or reimbursement of the amount from the user. To facilitate purchases and transfers of cryptocurrencies, transaction processing application 1032 may further be used. After accessing or obtaining of the cryptocurrency to be used for the transaction the user is engaging in and/or processing, crypto exchange platform 1040 may provide the currency to an account or digital wallet 1014 of the user. In some embodiments, crypto exchange platform 1040 may interface with different applications (e.g., via one or more API calls and/or requests), in order to facilitate automatic transaction processing and/or payment using the amount of funds of the cryptocurrency.

Transaction processing application 1032 may correspond to one or more processes to execute software using associated hardware components of transaction processor 1030 to process a transaction and/or exchange of an amount of funds from one currency to another currency. In some embodiments, transaction processing application 1032 may be used by a user associated with user device 1010 to establish a payment account and/or digital wallet, which may be used to process transactions and/or sell cryptocurrency. In various embodiments, an amount of funds in one or more currencies may be established for the account. A digital token for the wallet may be used to send and process payments, for example, through an interface provided by transaction processor 1030. The digital wallet may be accessed and/or used through a browser application/extension and/or dedicated payment application executed by user device 1010 and engage in electronic transaction processing, such as using cryptocurrency and/or through an amount of currency obtained from a sale of cryptocurrency. In various embodiments, transaction processing application 1032 may be used to access digital wallets 1240 for use in processing transactions. In this regard, user device 1010 may establish one or more transactions, which may be performed online or at physical merchant locations. In other embodiments, one or more transactions may correspond to checkout or payment requests where an amount of funds is to be paid to a seller, merchant, or other entity by a buyer, consumer, or similar entity using an amount of funds obtained from a sale or conversion of cryptocurrency.

In this regard, transaction processing application 1032 may interface with crypto exchange platform 1040 when obtaining an amount of cryptocurrency in order to process the transaction using a layer one network and/or a layer two network for the cryptocurrency. When performing transaction processing, transaction processing application 1032 may be required to process two or more transactions, transfers, or the like using crypto exchange platform 1040, and in particular, via transaction processor wallet 1044 on crypto exchange platform, with user device 1010 and merchant device 1020. In a first transaction after the user has been provided access to cryptocurrency from transaction processor wallet 1044 on the layer one network (or other processing channel, network, or layer) to transaction with merchant device 1020, transaction processing application 1032 may process a first transaction with digital wallet 124 for merchant device 1020 and/or the corresponding merchant. This may be directly from the cryptocurrency made available from transaction processor wallet 1044 and/or after providing the cryptocurrency to digital wallet 1014 associated with user device 1010. Thus, the transaction for the sale of goods between the user and the merchant using the cryptocurrency on the layer one network utilized by merchant device 1020 and/or digital wallet 124 may be resolved.

In a second transaction, as well as additional transactions for group payments, transfers, repayments, and/or reimbursements may be required from digital wallet 1014 associated with user device 1010 to transaction processor wallet 1044 associated with transaction processor 1030 and/or crypto exchange platform 1040. This may be required to provide back the amount of cryptocurrency that was made available to the user for the first transaction from transaction processor wallet 1044. The transfer from digital wallet 1014 to transaction processor 1044 may be implemented in response to, in synchronization with, and/or after making the amount of cryptocurrency available to the user or processing the transaction between the user and the merchant. Further, the transfer back to transaction processor wallet 1044 may be for the same or similar amount of cryptocurrency that was made available to the user and/or one or more of UTXOs 1046 provided to the user. In some embodiments, a price and/or amount may be set, where the cryptocurrency price may vary over time and the transfer back may later occur. When setting the rate or price, the value may be predicted as a potential value when repaying transaction processor wallet 1044 and/or achieve a net zero balance when making cryptocurrency available to users for transactions.

Additionally, transaction processor 1030 includes database 1036. Database 1036 may store various identifiers associated with user device 1010. Database 1036 may also store account data, including payment instruments and authentication credentials, as well as transaction processing histories and data for processed transactions. Digital wallets, such as digital wallets 1014 and 1024, stored by database 1036 may include data for accounts used for transaction processing including cryptocurrency transaction processing, access rights and/or permissions to cryptocurrency, and the like.

In various embodiments, transaction processor 1030 includes at least one network interface component 1038 adapted to communicate with user device 1010, merchant device 1020, and/or another device/server for a merchant over network 1050. In various embodiments, network interface component 1038 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 1050 may be implemented as a single network or a combination of multiple networks. For example, in various embodiments, network 1050 may include the Internet or one or more intranets, landline networks, wireless networks, and/or other appropriate types of networks. Thus, network 1050 may correspond to small scale communication networks, such as a private or local area network, or a larger scale network, such as a wide area network or the Internet, accessible by the various components of system 1000.

Although various components of system 1000 are described separately, functionality of the various components may be combined and/or performed by a single component and/or multiple computing devices in communication without departing from the invention.

Figure 11A:
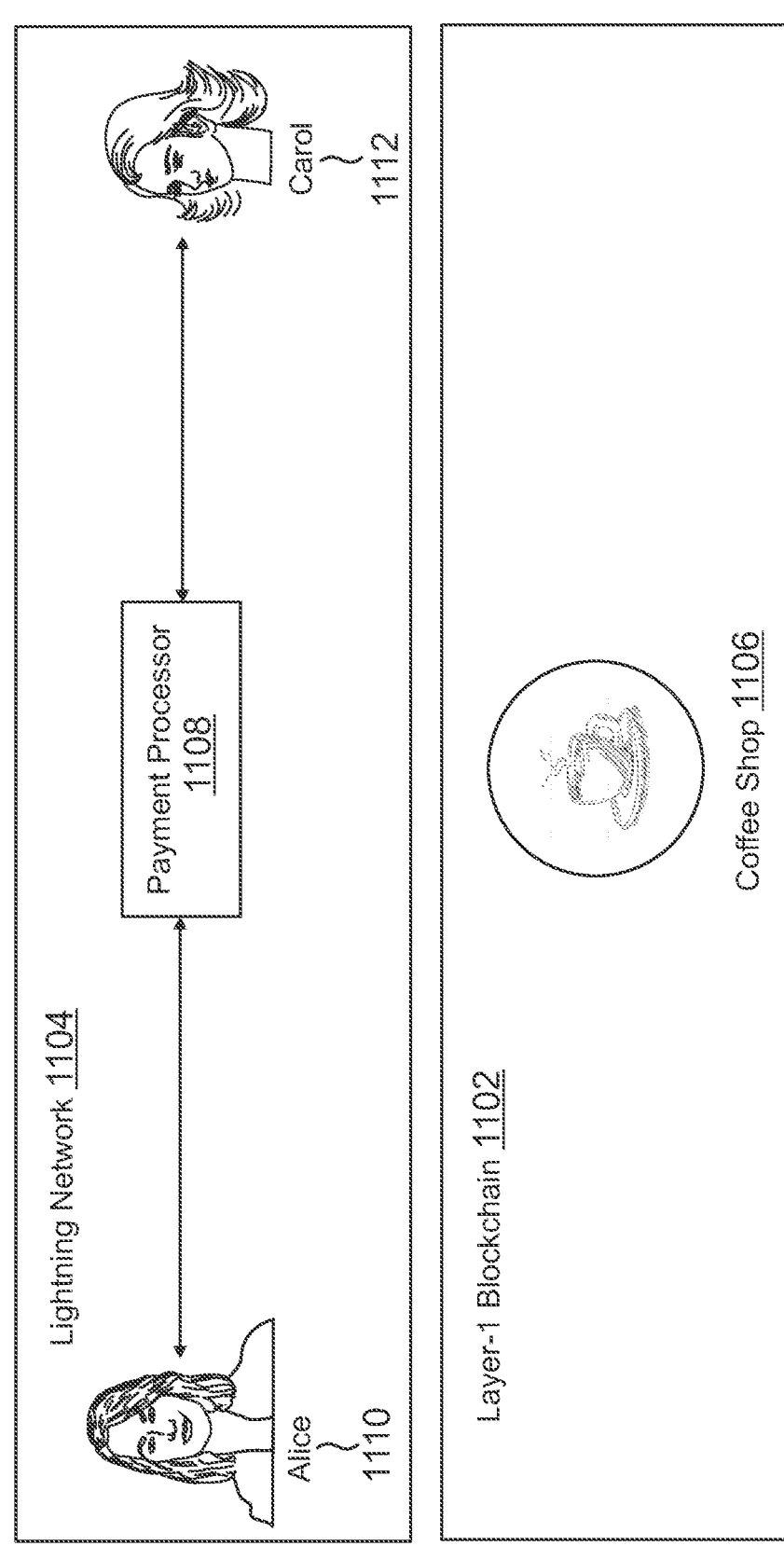
FIG. 11A illustrates an exemplary environment of users and merchants that have nodes on different network layers for a cryptocurrency, according to an embodiment.

FIG. 11A illustrates an exemplary environment 1100*a* of users and merchants that have nodes on different network layers for a cryptocurrency, according to an embodiment. In environment 1100*a*, which may correspond to a real-world and/or online digital environment, a user, Alice 1110, may utilize a computing device, such as a mobile smart phone, to interact with another user, Carol 1112 (e.g., another user for transfers and payments), where their respective computing devices may generally correspond to user device 1010 and/or merchant device 1020 from system 1000 of FIG. 10. However, Alice may only have off-chain balances available via a layer two network corresponding to Lightning network 1104 for the cryptocurrency to interact with Carol 1112, where a coffee shop 1106 may have a digital wallet on layer one blockchain 1102 but no node on Lightning network 1104 to interact and process off-chain transactions.

For example, Alice 1110 may visit a merchant location in a real-world and/or digital environment for environment 1100*a*. Carol 1112 may interact with Alice 1110, such as to provide, sell, transfer, and/or pay cryptocurrency on Lightning network 1104. This may be performed using payment processor 1108, such as transaction processor 1030 from system 1000 where crypto exchange platform 1040 provides cryptocurrency exchange operations. Payment processor 1108 may therefore provide for interactions between users on Lightning network 1104 that may allow for balances to be available off-chain and on a layer two network for the cryptocurrency. Thus, Alice 1110 may have an off-chain balance of cryptocurrency available on a layer two network.

However, Alice 1110 may then want to interact with coffee shop 1106 to purchase coffee and/or another item. Alice 1110 may have the available off-chain balance on the layer two network from Carol 1112. However, Alice 1110 may not have available on-chain balances of cryptocurrency for interaction with coffee shop 1106 via layer one blockchain 1102. Coffee shop 1106 may only interact on layer one blockchain 1102 and may not have a corresponding node, wallet, and/or balance on Lightning network 1104. This would require Alice 1110 (as well as Carol 1112 where Carol 1112 only has off-chain balances on Lightning network 1104) to convert the off-chain balance to an on-chain balance. This process may be time consuming, taking multiple minutes or longer with certain networks and cryptocurrencies. Thus, payment processor 1108 may be used to facilitate instant (e.g., real-time or near real-time) transfers and/or exchanges of cryptocurrency from off-chain balances to on-chain balances, as discussed further below with regard to FIG. 11B.

Figure 11B:
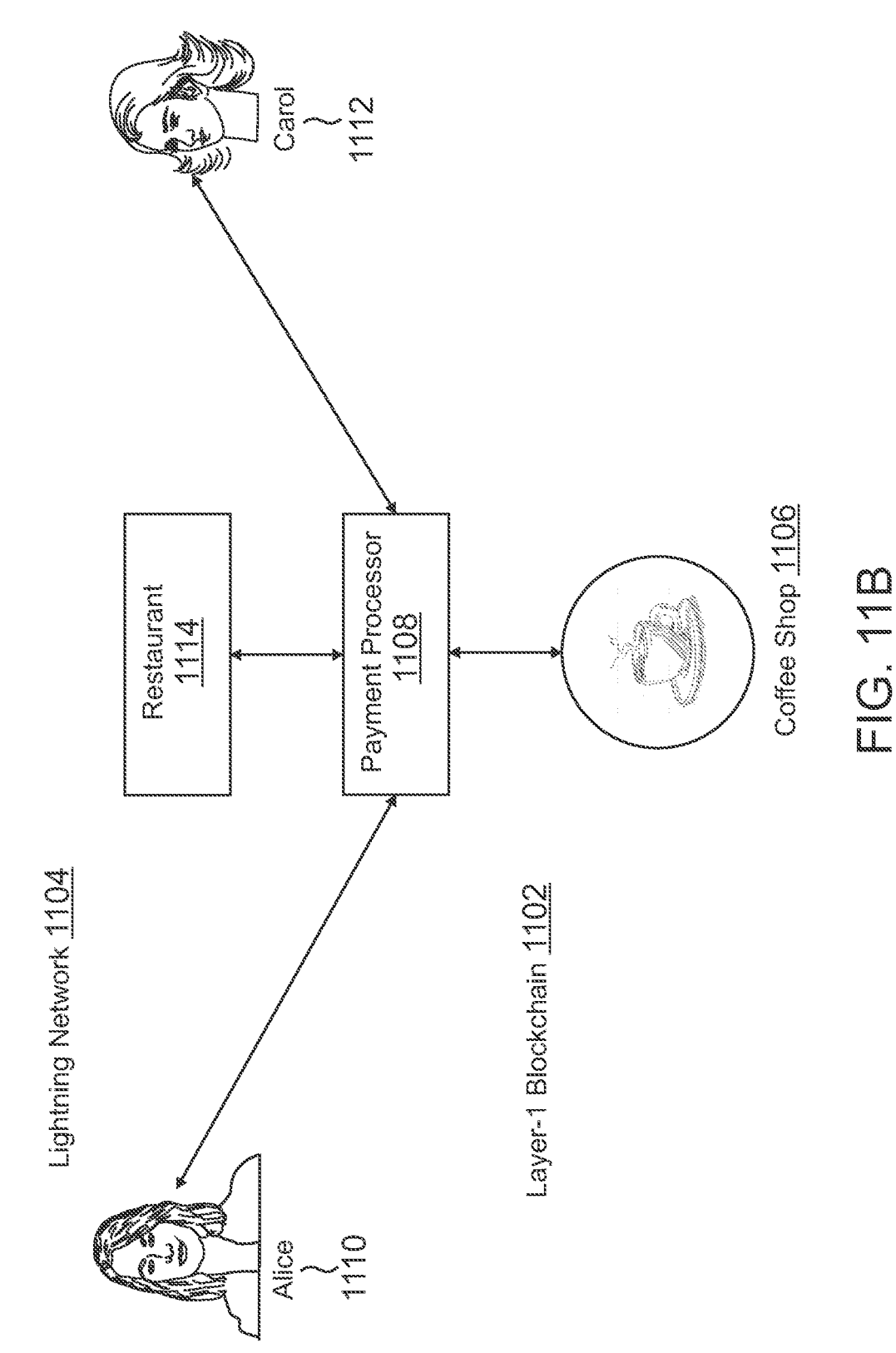
FIG. 11B illustrates an exemplary environment of users and merchants that may be facilitated through cryptocurrency made available on different network layers for a cryptocurrency, according to an embodiment.

FIG. 11B illustrates an exemplary environment 1100*b* of users and merchants that may have their transactions facilitated through cryptocurrency made available on different network layers for a cryptocurrency, according to an embodiment. In environment 1100*b*, which may correspond to a real-world and/or online digital environment, Alice 1110, may utilize a computing device, such as a mobile smart phone, to interact with Carol 1112, coffee shop 1106, and restaurant 1114 where their respective computing devices may generally correspond to user device 1010 and/or merchant device 1020 from system 1000 of FIG. 10. In this regard, payment processor 1108 may enable off-chain and on-chain transactions irrespective of the corresponding balances available to Alice 1110 and Carol 1112.

For example, payment processor 1108 may provide a cryptocurrency exchange platform and/or may provide for processing of transactions via a layer one network and a layer two network. Payment processor 1108 may generally prefer or utilize Lightning network 1104 or other layer two network for off-chain transactions of the cryptocurrency for efficiency, value, and/or speed. However, certain entities, such as coffee shop 1106, may not have an off-chain node, such as a node on Lightning network 1104 that allows for transaction processing via the layer two network. As such, payment processor 1108 may utilize an available digital wallet, amount of cryptocurrency, and/or UTXOs to allow for off-chain balance conversion to on-chain balances and transaction processing between Alice 1110 and/or Carol 1112 with coffee shop 1106.

In environment 1100*b*, Carol 1112 may have interacted with Alice 1110 to receive an off-chain balance on Lightning network 1104. Carol 1112 may then directly and/or via payment processor 1108 interact with restaurant 1114 on Lightning network 1104. This may be facilitated by payment processor 1108, which may receive the amount of cryptocurrency (or an access request to the amount from the digital wallet of Carol 1112 that is managed and/or on a crypto exchange platform for payment processor 1108), and thereafter provide the cryptocurrency to restaurant 1114. However, interacting on layer one blockchain 1102 with coffee shop 1106 may conventionally require significant time for Carol 1112 to convert the off-chain balance available to Carol 1112 to an on-chain balance to transact with coffee shop 1106 on layer one blockchain 1102.

In this regard, payment processor 1108 may determine that coffee shop 1106 does not have a node to interact with Carol 1112 on Lightning network 1104, such as an available balance, digital wallet, processing node, or the like for Lightning network 1104. Payment processor 1108 may instead determine an available digital wallet and amount of cryptocurrency on layer one blockchain 1102 for payment processor 1108. This may correspond to a digital wallet and/or available cryptocurrency for payment processor 1108 and/or on a crypto exchange platform or wallet. The amount of cryptocurrency may correspond to the amount that Carol 1112 requires to interact with coffee shop 1106, such as to purchase a coffee or another item from coffee shop 1106 using cryptocurrency on layer one blockchain 1102.

Payment processor 1108 may then determine whether to make this amount of cryptocurrency available to Carol 1112 from the digital wallet and/or cryptocurrency available to and/or controlled by payment processor 1108. The decision may be based on a risk analysis and/or fraud detection determination by payment processor 1108. If access is granted, Carol 1112 may be then provided access to the cryptocurrency and/or availability to utilize and transact using the cryptocurrency (e.g., by providing private keys, transferring, and/or enabling Carol 1112 to request usage of the cryptocurrency). In order to facilitate the conversion from the off-chain balance to the on-chain balance and transactions on layer one blockchain 1102, payment processor 1108 may select one or more UTXOs to provide Carol 1112 and expose or provide the private key(s) for those UTXOs.

Thus, a credit may be extended to Carol 1112 and Carol 1112 may then transact with coffee shop 1106 to purchase coffee or other items. Carol 1112 may then be required to repay and/or transfer the corresponding amount of cryptocurrency to the digital wallet of payment processor 1108 on Lightning network 1104, such as by using the available off-chain balance of Carol 1112. Penalties may be implemented if Carol 1112 does not repay or take time for repayment, such as account closure, asset forfeiture, and/or fee penalties, which may be correlated to changes in cryptocurrency price. While it is described above that Carol 1112 may receive the private keys and then provide a transfer back of cryptocurrency on Lightning network 1104, in other embodiments, these interactions may occur simultaneously and/or Carol 1112 may be required to first pay for the amount of the cryptocurrency on Lightning network 1104 before being provided with access to and/or private keys of the amount of the cryptocurrency on layer one blockchain 1102.

Figure 12:
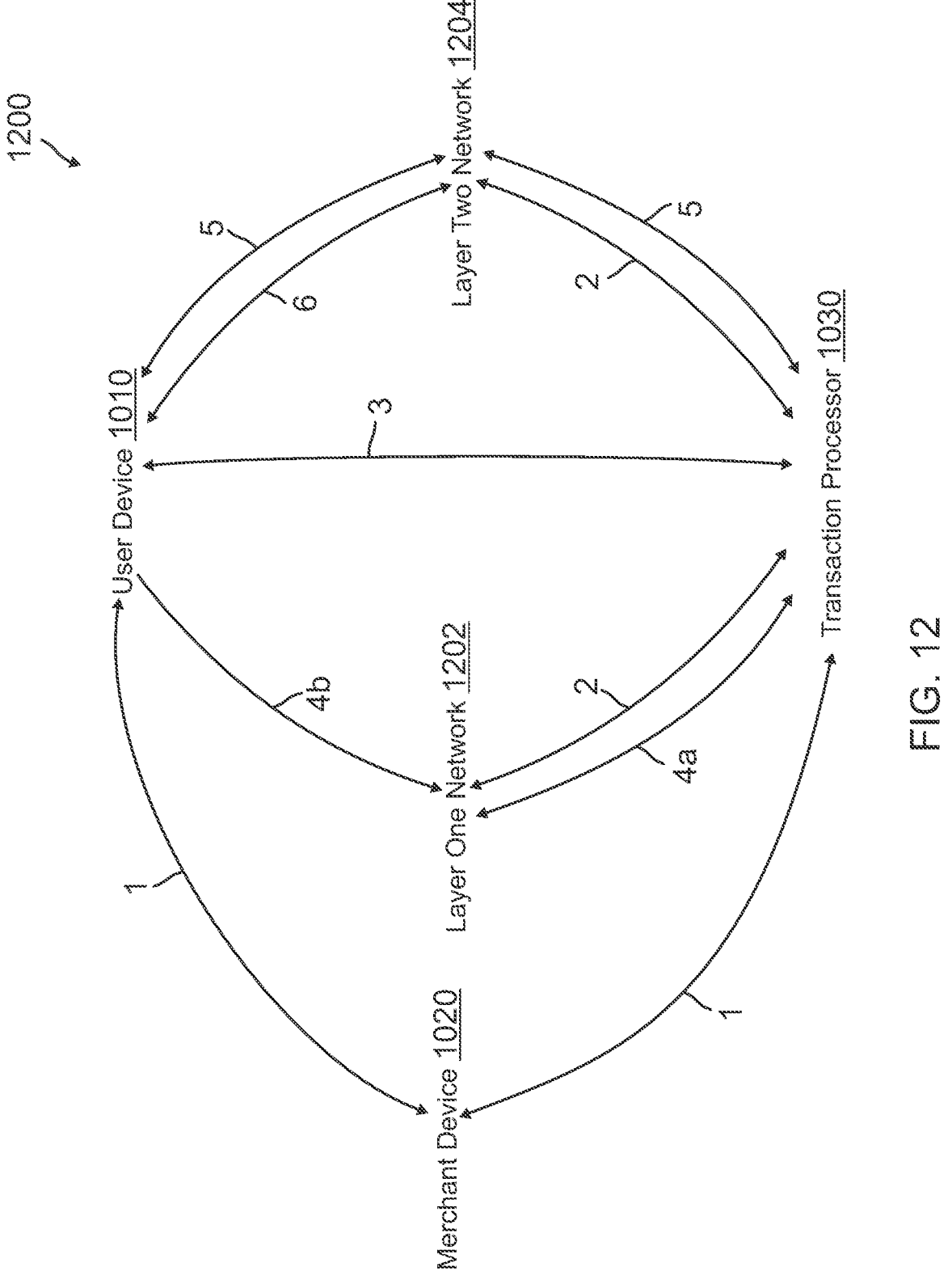
FIG. 12 illustrates exemplary interactions between different computing devices, servers, and nodes through different network layers for a cryptocurrency, according to an embodiment.

FIG. 12 illustrates exemplary interactions 1200 between different computing devices, servers, and nodes through different network layers for a cryptocurrency, according to an embodiment. Interactions 1200 in FIG. 12 are with user device 1010, merchant device 1020, and transaction processor 1030, discussed in reference to system 1000 of FIG. 10. User device 1010, merchant device 1020, and transaction processor 1030 may interact over a layer one network 1202 and a layer two network 1204 for a cryptocurrency and blockchain protocol for transaction processing using on-chain and off-chain transactions and balances.

In this regard, interactions 1200 include an interaction 1, where user device 1010 interacts with merchant device 1020 to process a transaction using an amount of cryptocurrency, which requires transaction processor 1030 to perform electronic transaction processing for the amount of the cryptocurrency. This may correspond to an in-person transaction (e.g., POS device transaction at a merchant location) or an online digital transaction by a user with a merchant. At an interaction 2, transaction processor 1030 may determine available digital wallets, balances, and/or other cryptocurrency processing nodes for user device 1010 and merchant device 1020 on layer one network 1202 and layer two network 1204. This may correspond to determining the available nodes for interaction and cryptocurrency processing that are available to both entities. Interaction 2 may be performed in response to user device 1010 and/or merchant device 1020 requesting to interact and process a transaction via a specific channel, network, or other layer for the cryptocurrency that is designated for payment in the transaction. For example, during interaction 2, it may be determined that a digital wallet associated with user device 1010 has and/or has designated cryptocurrency available via layer two network 1204 (e.g., for an off-chain balance of the digital wallet), while merchant device 1020 and/or a corresponding digital wallet does not have a node to transact on layer two network 1204 and instead utilizes balances, digital wallets, or other nodes for cryptocurrency transaction processing via layer one network 1202 for the cryptocurrency.

At interaction 3, transaction processor 1030 determines and makes available an amount of cryptocurrency from a digital wallet of transaction processor 1030 to user device 1010. During interaction 3, a risk analysis may be performed of user device 1010, merchant device 1020, and/or the underlying data of the transaction and/and digital wallets of user device 1010 and merchant device 1020. The risk analysis may be performed to determine whether to extend credit and/or underwrite user device 1010 for access to cryptocurrency from the digital wallet of transaction processor 1030. The risk analysis may also consider likelihood of repayment of the cryptocurrency and/or cryptocurrency or other assets (digital, fiat, or the like) available to user device 1010.

If approved, user device 1010 may then be informed of the availability of the cryptocurrency on layer one network 1202, such as by providing an option to utilize and/or access to private keys for the amount of the cryptocurrency to enable user device 1010 and merchant device 1020 to process the transaction via layer one network 1202. Thus, during an interaction 4a, transaction processor 1030 may provide access to the amount of the cryptocurrency to user device 1010 on layer one network 1202. This may include determining one or more UTXOs for the cryptocurrency to provide via layer one network 1202. Thereafter, during an interaction 4b, user device 1010 is provided access to the amount of the cryptocurrency via layer one network 1202. User device 1010 may then be used to transact with the amount of the cryptocurrency on layer one network 1202, such as by providing a payment for the transaction requested during interaction 1.

However, user device 1010 may be responsible for repayment and/or transfer of the amount of the cryptocurrency provided by the digital wallet of transaction processor 1030 back to that corresponding digital wallet, which occurs via layer two network 1204 for the corresponding amount of cryptocurrency that is available off-chain to the digital wallet associated with user device 1010. In this regard, user device 1010 has been enabled to utilize on-chain cryptocurrency and balances on layer one network 1202 with merchant device 1020, but requires a corresponding repayment, such as by providing back the corresponding amount of off-chain cryptocurrency balance on layer two network 1204. Thus, at an interaction 5, the off-chain amount of the cryptocurrency is requested, transferred, and/or paid from user device 1010 to transaction processor 1030 to resolve the amount made available to user device 1010 from the digital wallet of transaction processor 1030 on layer one network 1202. It is noted that interactions 4a, 4b, 5a, and/or 5b may be performed at substantially the same time and/or in any order to provide access to and/or transfers of cryptocurrency via layer one network 1202 and layer two network 1204. Thereafter, during an interaction 6, user device 1010 is updated with their available cryptocurrency balance via layer two network 1204 and of the payment to merchant device 1020 that was facilitated via transaction processor 1030.

FIG. 13 illustrates a flowchart 1300 for multi-layer cryptocurrency conversions using available blockchain outputs, according to an embodiment. Note that one or more steps, processes, and methods described herein of flowchart 1300 may be omitted, performed in a different sequence, or combined as desired or appropriate.

At step 1302 of flowchart 1300, a request to transact/transfer an amount of cryptocurrency from a first digital wallet of a user to a second digital wallet of an entity is detected. The transfer request may correspond to a request to utilize the cryptocurrency to fund a purchase on-line or in-store with an entity, such as a merchant or another user. Furthermore, the request may be initiated based on a number of factors such as a cryptocurrency being designated as a default payment option for the user, or being designated as a default payment option for the user when transacting with a specific merchant or merchant location. For example, a user may walk into a merchant location, and upon utilizing his/her mobile device to initiate a payment via a service provider, the payment application may identify that a cryptocurrency is designated as the payment option for the user or for the particular transaction. In addition, the transfer request may designate an amount of the cryptocurrency. Furthermore, in response to detecting the request, the service provider may determine a means of transaction for the cryptocurrency transaction based on factors such as fees, latency, and also whether or not the transactors have the capability of transacting via a layer one or layer two network.

At step 1304, it is determined, for the cryptocurrency, that the entity does not have a node to transact on a layer two network associated with the cryptocurrency, and therefore, is not capable of receiving a transaction via the layer two network. For example, the user may have an off-chain balance on the layer two network but may wish to transact with the entity. However, the entity may only have a digital wallet, address, and/or cryptocurrency available on the layer one network. Thus, it may be determined that the entity cannot transact with the user using off-chain balances and on the layer two network. Cryptocurrency available to the user and/or entity may be determined using a digital wallet, account with an online cryptocurrency exchange platform, another digital account of the user with an online transaction processor, and the like, which may be accessed for information for available digital assets. The available cryptocurrencies and/or balances for the cryptocurrencies may be identified using this information, as well as any other balance of other virtual currencies (e.g., NFTs) and the like.

In one or more embodiments, the service provider's or other transaction processor's digital wallet may have available cryptocurrencies, such as by UTXOs on the layer one network, which may allow the user to transact with the entity via the layer one network and/or using on-chain balances. Further, the service provider's digital wallet may have a node, off-chain balances, and/or the like to transact with the user on the layer two network. At step 1306, the service provider may provide the user with access to the service provider digital wallet so that the user may utilize the service provider digital wallet to pay for the transaction (perform the transfer) with the entity on the layer one network. This access may include providing the user with access to cryptocurrency and/or private keys to conduct on-chain transactions using the cryptocurrency with other on-chain digital wallets, thereby providing transfers of cryptocurrency using on-chain recordation.

In one or more embodiments, the service provider may perform a risk analysis prior to the service provider providing access to the service provider digital wallet. For example, the transaction request may be detected, and upon detecting, the service provider digital wallet may determine based on a variety of factors, a risk score associated with the user. The risk score may be based on factors such as prior transactions the user has performed via/with the service provider (crypto and/or non-crypto transactions), credit/loan history, whether the user has any pending loans or is late on any potential repayments, the general volume of transactions the user performs using the service provider, the number of transactions the user performs using the service provider, the amount/value corresponding to the current transaction/transfer, and additional related factors. Based on one or more of the recited factors (and/or additional criteria not recited above), the service provider may generate a risk score associated with the user. The service provider may then compare the generated risk score with a threshold risk score to determine if the user is eligible to be provided with access to the service provider digital wallet for performing the transaction with the entity. If the risk score is above the threshold score, the service provider may provide access to the service provider digital wallet. If the risk score is below the threshold score, the service provider may not allow the user to have access to the service provider digital wallet or may instead provide more limited access, such as access to a limited amount of funds.

At step 1308, based on initiation by the user, a transaction is processed with the entity using the amount of the cryptocurrency from the service provider wallet. Thus, the user may request and/or utilize the amount of cryptocurrency to transact with the entity via the layer one network. This may be done using the exposed private keys of the UTXOs from the service provider on the layer one network using on-chain balances from the service provider's wallet. At step 1310, in response to detecting the initiation or completion of the transaction recited in step 1308, the service provider automatically invokes a transfer of the amount of the cryptocurrency from the user to the service provider digital wallet via the layer two network. In one or more embodiments, the two transactions may be linked, and the user may be required to sign both transactions at the same time or within a specific time period prior to any funds being moved. The transfer may be performed on the layer two network in order to provide reimbursement of the amount of the cryptocurrency from the user to the service provider for the amount that the user was provided access to from the wallet of the service provider. Steps 1308 and 1310 may occur substantial together or in reverse order in order to provide proper risk allocation between the user, the service provider, and the entity in the transaction.

In further embodiments, rather than the service provider determining whether to utilize layer one or a layer two network for the transaction, the transfer request may designate a transaction processing channel, such as on a layer one network (e.g., on-chain) or a layer two network (e.g., off-chain), for transferring and payment of the cryptocurrency. Thus, the transfer request may designate the amount of cryptocurrency from the first digital wallet that is to be paid to the second digital wallet but may further designate the transaction to be processed on-chain or off-chain for the available and/or designated balance of the user.

Figure 14:
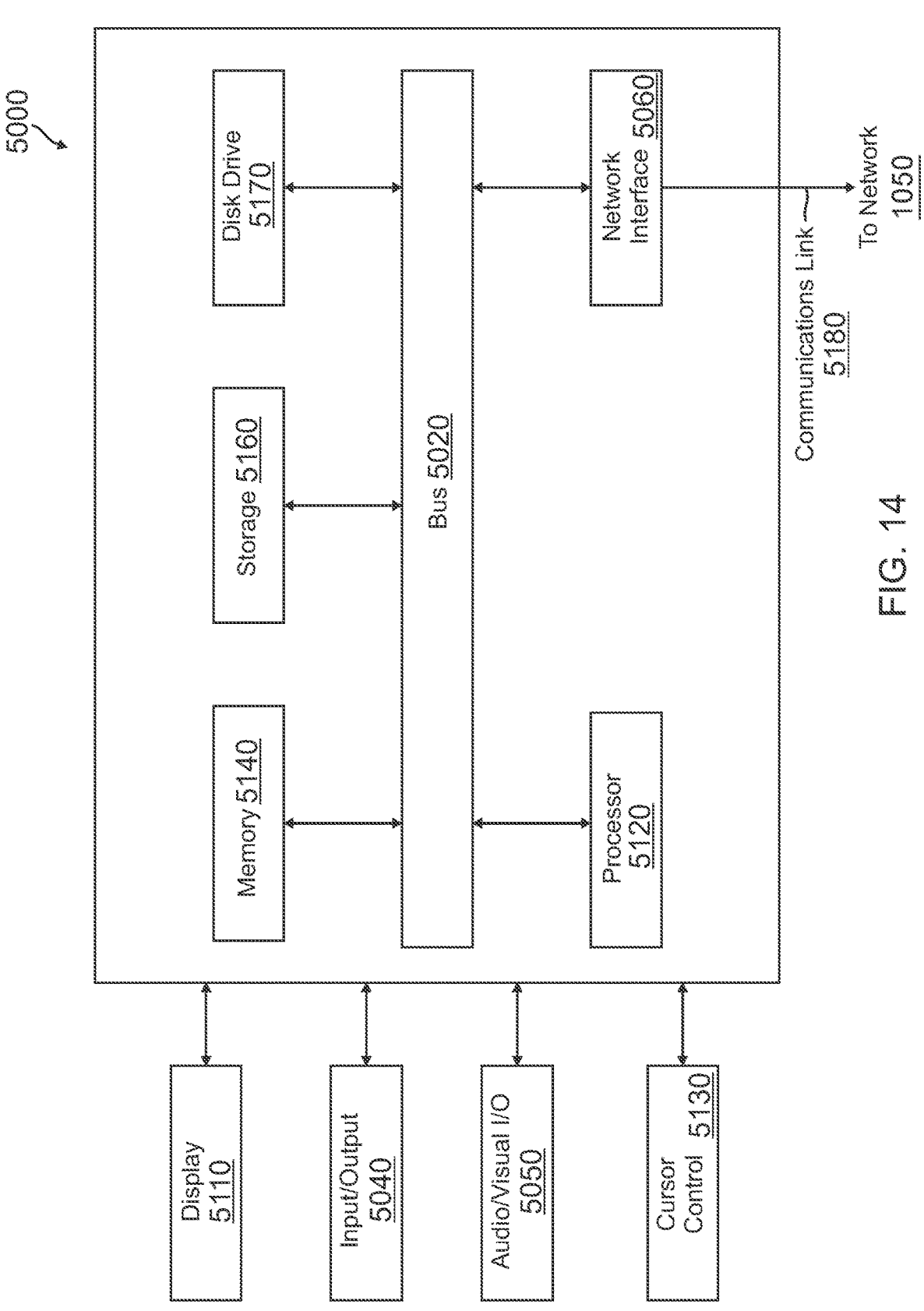
FIG. 14 illustrates a block diagram of a computer system suitable for implementing one or more components in FIG. 1, according to an embodiment.

FIG. 14 is a block diagram of a computer system 5000 suitable for implementing one or more components in FIG. 10, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 5000 in a manner as follows.

Computer system 5000 includes a bus 5020 or other communication mechanism for communicating information data, signals, and information between various components of computer system 5000. Components include an input/output (I/O) component 5040 that processes a user action, such as selecting keys from a keypad/keyboard, selecting one or more buttons, image, or links, and/or moving one or more images, etc., and sends a corresponding signal to bus 5020. I/O component 5040 may also include an output component, such as a display 5110 and a cursor control 5130 (such as a keyboard, keypad, mouse, etc.). An optional audio input/output component 5050 may also be included to allow a user to use voice for inputting information by converting audio signals. Audio I/O component 5050 may allow the user to hear audio. A transceiver or network interface 5060 transmits and receives signals between computer system 5000 and other devices, such as another communication device, service device, or a service provider server via a network 1600, such as network 1050 of FIG. 10. In one embodiment, the transmission is wireless, although other transmission mediums and methods may also be suitable. One or more processors 5120, which can be a micro-controller, digital signal processor (DSP), or other processing component, processes these various signals, such as for display on computer system 5000 or transmission to other devices via a communication link 5180. Processor(s) 5120 may also control transmission of information, such as cookies or IP addresses, to other devices.

Components of computer system 5000 also include a system memory component 5140 (e.g., RAM), a static storage component 5160 (e.g., ROM), and/or a disk drive 5170. Computer system 5000 performs specific operations by processor(s) 5120 and other components by executing one or more sequences of instructions contained in system memory component 5140. Logic may be encoded in a computer readable medium, which may refer to any medium that participates in providing instructions to processor(s) 5120 for execution. Such a medium may take many forms, including but not limited to, non-volatile media, volatile media, and transmission media. In various embodiments, non-volatile media includes optical or magnetic disks, volatile media includes dynamic memory, such as system memory component 5140, and transmission media includes coaxial cables, copper wire, and fiber optics, including wires that comprise bus 5020. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 5000. In various other embodiments of the present disclosure, a plurality of computer systems 5000 coupled by communication link 5180 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computing system comprising:

a non-transitory memory; and one or more hardware processors coupled to the non-transitory memory and configured to read instructions from the non-transitory memory to cause the computing system to perform operations comprising:

receiving, by a service provider from a device of a user, a request to transfer, via a cryptocurrency protocol, an amount of cryptocurrency in a first digital wallet of the user to a second digital wallet associated with an entity;

determining that the first digital wallet transacts on a layer two network associated with a cryptocurrency protocol;

identifying one or more processing nodes available to the entity for processing cryptocurrency transactions associated with the cryptocurrency protocol based at least on the second digital wallet;

determining that the entity does not have a node available on the layer two network associated with the cryptocurrency protocol based on the one or more processing nodes;

performing a risk assessment of at least the user, wherein the risk assessment is performed at least in part based on a difference between the amount of cryptocurrency and unspent transaction outputs (UTXO) of a third digital wallet associated with the service provider;

determining, based on the risk assessment, whether the user qualifies for an access to utilize the UTXO of the third digital wallet;

providing, based on a determination that the user qualifies for the access to utilize the UTXO of the third digital wallet, the user with the access to utilize the third digital wallet associated with the service provider, wherein the access is provided with a usage limitation on the third digital wallet;

processing a transaction between the first digital wallet and the third digital wallet via the layer two network associated with the cryptocurrency protocol, wherein the transaction corresponds to a transfer associated with the amount of cryptocurrency from the first digital wallet to the third digital wallet via the layer two network;

accessing one or more private encryption keys for the amount of cryptocurrency from the third digital wallet based on the transaction;

digitally signing one or more cryptocurrency transactions from the third digital wallet to the second digital wallet using the one or more private encryption keys on the layer one network independent of interacting with the first digital wallet on the layer two network;

transferring the amount of cryptocurrency to the second digital wallet of the entity based on the digitally signing and the one or more private encryption keys; and updating the second digital wallet based on the one or more cryptocurrency transactions to reflect the transfer for the amount of cryptocurrency from on the layer one network.

2. The computing system of claim 1, wherein the operations further comprise:

performing a further risk assessment of at least one of the request or the first digital wallet, wherein the providing the user with the access is in response to the further risk assessment meeting or exceeding a positive risk threshold.

3. The computing system of claim 1, wherein the providing the user with the access is performed on the layer one network for the cryptocurrency protocol.

4. The computing system of claim 1, wherein the amount of cryptocurrency transferred from the third digital wallet to the second digital wallet and transferred from the first digital wallet to the third digital wallet via the layer two network are matching amounts, and wherein the providing the user with the access does not require a reimbursement transaction for an excess amount.

5. The computing system of claim 1, wherein the amount of cryptocurrency transferred from the third digital wallet to the second digital wallet and transferred from the first digital wallet to the third digital wallet via the layer two network are different amounts requiring a reimbursement transaction for an excess amount provided to one of the user or the entity, and wherein the operations further comprise:

implementing the reimbursement transaction for the excess amount from the user.

6. The computing system of claim 1, wherein the operations further comprise:

processing the transaction for the amount of cryptocurrency via the layer two network of the cryptocurrency protocol.

7. The computing system of claim 1, wherein the receiving the request comprises one of:

receiving a payment request for the amount of cryptocurrency from the user to the entity on the layer one network of the cryptocurrency protocol; or receiving a conversion request of at least a portion of the amount of cryptocurrency for the transaction from the device of the user via the first digital wallet.

8. The computing system of claim 7, wherein a processing of the transaction via the layer one network for the cryptocurrency protocol requires an amount of time exceeding a processing of the transaction via the layer two network, and wherein the amount of cryptocurrency is unavailable to the first digital wallet on the layer one network.

9. The computing system of claim 1, wherein the first digital wallet corresponds to an account of the user with the service provider.

10. A method, comprising:

receiving, by a service provider from a device of a user, a request to transfer, via a cryptocurrency protocol, an amount of cryptocurrency in a first digital wallet of the user to a second digital wallet associated with an entity;

determining that the first digital wallet transacts on a layer two network associated with the cryptocurrency protocol;

identifying one or more processing nodes available to the entity for processing cryptocurrency transactions associated with the cryptocurrency protocol based at least on the second digital wallet;

determining that the entity does not have a node available on the layer two network associated with the cryptocurrency protocol based on the one or more processing nodes;

performing a risk assessment of at least the user, wherein the risk assessment is performed at least in part based on a difference between the amount of cryptocurrency and unspent transaction outputs (UTXO) of a third
digital wallet associated with the service provider;
determining, based on the risk assessment, whether the
user qualifies for an access to utilize the UTXO of the
third digital wallet;
providing, based on a determination that the user qualifies
for an access to utilize the UTXO of the third digital
wallet, the user with the access to utilize the third
digital wallet associated with the service provider,
wherein the access is provided with a usage limitation
on the third digital wallet;
processing a transaction between the first digital wallet
and the third digital wallet via the layer two network
associated with the cryptocurrency protocol, wherein
the transaction corresponds to a transfer associated with
the amount of cryptocurrency from the first digital
wallet to the third digital wallet via the layer two
network;
accessing one or more private encryption keys for the
amount of cryptocurrency from the third digital wallet
based on the transaction;
digitally signing one or more cryptocurrency transactions
from the third digital wallet to the second digital wallet
using the one or more private encryption keys on the
layer one network independent of interacting with the
first digital wallet on the layer two network;
transferring the amount of cryptocurrency to the second
digital wallet of the entity based on the digitally signing
and the one or more private encryption keys; and
updating the second digital wallet based on the one or
more cryptocurrency transactions to reflect the transfer
for the amount of cryptocurrency from on the layer one
network.

11. The method of claim 10, further comprising:
performing a further risk assessment of at least one of the
request or the first digital wallet,
wherein the providing the user with the access is in
response to the further risk assessment meeting or
exceeding a positive risk threshold.

12. The method of claim 10, wherein the providing the
user with the access is performed on the layer one network
for the cryptocurrency protocol.

13. The method of claim 10, wherein the first digital
wallet corresponds to an account of the user with the service
provider.

14. The method of claim 10, wherein the amount of
cryptocurrency transferred from the third digital wallet to
the second digital wallet and transferred from the first digital
wallet to the third digital wallet via the layer two network are
matching amounts, and wherein the providing the user with
the access does not require a reimbursement transaction for
an excess amount.

15. A non-transitory machine-readable medium having
stored thereon machine-readable instructions executable to
cause a machine to perform operations comprising:
receiving, by a service provider from a device of a user,
a request to transfer, via a cryptocurrency protocol, an
amount of cryptocurrency in a first digital wallet of the
user to a second digital wallet associated with an entity;
determining that the first digital wallet transacts on a layer
two network associated with the cryptocurrency pro-
tocol;
identifying one or more processing nodes available to the
entity for processing cryptocurrency transactions asso-
ciated with the cryptocurrency protocol based at least
on the second digital wallet;

determining that the entity does not have a node available
on the layer two network associated with the crypto-
currency protocol based on the one or more processing
nodes;
performing a risk assessment of at least the user, wherein
the risk assessment is performed at least in part based
on a difference between the amount of cryptocurrency
and unspent transaction outputs (UTXO) of a third
digital wallet associated with the service provider;
determining, based on the risk assessment, whether the
user qualifies for an access to utilize the UTXO of the
third digital wallet;
providing, based on a determination that the user qualifies
for the access to utilize the UTXO of the third digital
wallet, the user with the access to utilize the third
digital wallet associated with the service provider,
wherein the access is provided with a usage limitation
on the third digital wallet;
processing a transaction between the first digital wallet
and the third digital wallet via the layer two network
associated with the cryptocurrency protocol, wherein
the transaction corresponds to a transfer associated with
the amount of cryptocurrency from the first digital
wallet to the third digital wallet via the layer two
network;
accessing one or more private encryption keys for the
amount of cryptocurrency from the third digital wallet
based on the transaction;
digitally signing one or more cryptocurrency transactions
from the third digital wallet to the second digital wallet
using the one or more private encryption keys on the
layer one network independent of interacting with the
first digital wallet on the layer two network;
transferring the amount of cryptocurrency to the second
digital wallet of the entity based on the digitally signing
and the one or more private encryption keys; and
updating the second digital wallet based on the one or
more cryptocurrency transactions to reflect the transfer
for the amount of cryptocurrency from on the layer one
network.

16. The non-transitory machine-readable medium of
claim 15, wherein the operations further comprise:
performing a further risk assessment of at least one of the
request or the first digital wallet,
wherein the providing the user with the access is in
response to the further risk assessment meeting or
exceeding a positive risk threshold.

17. The non-transitory machine-readable medium of
claim 15, wherein the providing the user with the access is
performed on the layer one network for the cryptocurrency
protocol.

18. The non-transitory machine-readable medium of
claim 15, wherein the amount of cryptocurrency transferred
from the third digital wallet to the second digital wallet and
transferred from the first digital wallet to the third digital
wallet via the layer two network are matching amounts, and
wherein the providing the user with the access does not
require a reimbursement transaction for an excess amount.

19. The non-transitory machine-readable medium of
claim 15, wherein the receiving the request comprises one
of:
receiving a payment request for the amount of cryptocur-
rency from the user to the entity on the layer one
network of the cryptocurrency protocol; or
receiving a conversion request of at least a portion of the
amount of cryptocurrency for the transaction from the
device of the user via the first digital wallet.

20. The non-transitory machine-readable medium of claim 15, wherein the first digital wallet corresponds to an account of the user with the service provider.

\* \* \* \* \*